(12) United States Patent
Kotreka et al.

(10) Patent No.: US 9,313,630 B2
(45) Date of Patent: Apr. 12, 2016

(54) REAL TIME SMS DELIVERY MECHANISM

(71) Applicant: Qualcomm Incorporated, San Diego, CA (US)

(72) Inventors: Ravi Kanth Kotreka, Hyderabad (IN); Pavan Kumar Kadiyala, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 226 days.

(21) Appl. No.: 13/727,313

(22) Filed: Dec. 26, 2012

(65) Prior Publication Data

US 2014/0179361 A1    Jun. 26, 2014

(51) Int. Cl.
*H04W 4/00* (2009.01)
*H04W 4/14* (2009.01)
*H04M 3/42* (2006.01)

(52) U.S. Cl.
CPC ............ *H04W 4/14* (2013.01); *H04M 3/42382* (2013.01); *H04M 3/42365* (2013.01); *H04M 2203/1008* (2013.01); *H04M 2203/651* (2013.01)

(58) Field of Classification Search
CPC ......... H04W 4/12; H04W 4/14; H04W 76/02; H04W 76/025; H04M 1/42538; H04M 11/00; H04M 1/72519; H04M 3/42382; H04M 3/436
USPC .......................... 455/466, 412.1, 412.2, 414.1
See application file for complete search history.

(56) References Cited

U.S. PATENT DOCUMENTS

2003/0046328 A1* 3/2003 Goo .................... H04L 12/5895
709/200
2005/0122898 A1* 6/2005 Jang et al. ..................... 370/218
2007/0293252 A1* 12/2007 Kim et al. ..................... 455/466
2009/0225972 A1* 9/2009 Kahn ......................... 379/210.02

(Continued)

FOREIGN PATENT DOCUMENTS

EP             2346234 A1    7/2011
WO    WO-2007129989 A1   11/2007
WO    WO-2008128053 A1   10/2008

OTHER PUBLICATIONS

International Search Report and Written Opinion—PCT/US2013/077317—ISA/EPO—Feb. 18, 2014.
Taiwan Search Report—TW102148215—TIPO—Feb. 6, 2015.

*Primary Examiner* — Allahyar Kasraian
(74) *Attorney, Agent, or Firm* — James Hunt Yancey, Jr.; Satheesh Karra

(57) ABSTRACT

Real-time Short Message Service (SMS) messaging between an originating device such as a mobile device or Short Message Entity (SME) and a destination device such as a mobile device or SME. The real-time SMS messaging may be provided by initiating a call session between the originating device and the destination device, sending the SMS message within the call session, and terminating the call session prior to establishment of dedicated call traffic resources. In some embodiments, existing mobile protocol stacks may be employed by using existing voice call setup procedures to initiate the call session before sending the SMS message. In some embodiments, call session protocol stacks are extended to provide for an indication of a real-time SMS session type in the call session setup signaling. Real-time SMS messaging may be offered as a value added service, according to various embodiments. Other aspects, embodiments, and features are also claimed and described.

32 Claims, 13 Drawing Sheets

(56) References Cited

U.S. PATENT DOCUMENTS

| | | | |
|---|---|---|---|
| 2010/0093315 A1* | 4/2010 | Grosch et al. | 455/412.2 |
| 2010/0322399 A1* | 12/2010 | Couse et al. | 379/93.17 |
| 2011/0177800 A1* | 7/2011 | Gilson | 455/417 |
| 2011/0286591 A1 | 11/2011 | Fulton et al. | |
| 2012/0034938 A1 | 2/2012 | Kreitzer et al. | |
| 2012/0057586 A1 | 3/2012 | Midkiff | |
| 2012/0166566 A1 | 6/2012 | Akama | |
| 2012/0179550 A1 | 7/2012 | Vieri | |
| 2013/0143534 A1* | 6/2013 | Ferringo et al. | 455/414.1 |

* cited by examiner

REAL TIME SMS DELIVERY MECHANISM

TECHNICAL FIELD

Embodiments of the present invention relate generally to communication systems, and more specifically to real time message delivery for use in enabling distribution of messages.

BACKGROUND

Since its introduction, Short Message Service (SMS) has become widely adopted for sending short text messages between mobile devices and/or fixed line devices. For example, over 3.7 billion people worldwide use SMS text messaging, making it the most widely used mobile data application in the world. Other types of messaging are also increasing in usage, including Multimedia Messaging Service (MMS) and/or other types of messaging that allow voice, image, or other data to be sent from or to mobile devices using the mobile device number for addressing. In some contexts, the term SMS may be used to refer to any type of messaging, including MMS.

Generally, mobile device messaging services operate using a store and forward mechanism. In these store and forward mechanisms, an originating device sends a message to a network. The network can store the message and forwards the message to the destination device when delivery is convenient based on other signaling overhead or communications between the destination device and the network. In some scenarios, the network may route the message to a different network associated with the destination device. The store and forward architecture of mobile messaging services can lead to a time delay between when the user of the originating device sends a message and when the destination device receives the message. In addition, most messaging services do not include any service guarantees. Messaging services may delay or even drop messages because of factors such as network congestion or signaling protocol failure such that they are not received at all by the destination device, sometimes with no indication that the message has been lost.

While unreliable, these messaging services are also increasingly being used for purposes other than sending messages between users, such as various notification, mobile banking, access control, and/or social media purposes. For example, some banking security systems use SMS to verify that the user associated with the account is making a particular transaction. The bank may send a transaction identifier to a mobile number associated with a banking account upon an attempt by the customer to perform a banking transaction involving the account. The transaction identifier may be required in addition to a personal identification number and/or other control identifiers to complete the transaction. In these and other time-critical and/or high priority applications, the delay or inconsistent operation of the store and forward mechanism of mobile messaging services may create serious problems for users.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Described embodiments provide real-time SMS messaging between an originating device such as a mobile device or Short Message Entity (SME) and a destination device such as a mobile device or SME. The real-time SMS messaging may be provided by initiating a call session between the originating device and the destination device through a core network, sending the SMS message within the call session, and terminating the call session prior to establishment of dedicated call traffic resources. An originating device for a real-time message may initiate the call session by sending a call session setup message to the network. The call session setup message may indicate, for example, that the originating device is attempting to set up a voice call with the destination device. The network may page the destination device or otherwise determine whether the destination device is available to answer the call. The SMS message may be sent when the originating device receives a call confirmation that the destination device is available to answer the call. The call session may then be terminated prior to establishment of traffic radio bearers and/or traffic channels associated with the call session.

In some embodiments, existing mobile protocol stacks may be employed to provide real-time messaging by using voice call setup procedures to establish a call session between an originating device and a destination device before sending the SMS message. Messaging procedures may then be used to send the SMS message and receive an acknowledgement that the SMS message has been received by the destination device. The call session may be terminated before establishment of a traffic channel for the call.

In some embodiments, call session protocol stacks are extended to provide for an indication of a real-time SMS session type in the call session setup signaling between the originating device, the network, and/or the destination device. In these embodiments, an originating device may send a call setup message to the network and indicate in the message that the reason for the call setup is to send a real-time SMS to the destination device. The network may indicate in call setup messaging to the destination device that the reason for call setup is a real-time SMS message. Real-time SMS messaging may be offered as a value added service, according to various embodiments.

Some embodiments are directed to methods for real-time messaging over wireless communication networks that may be performed by an originating device. In some embodiments, a method for wireless communication includes initiating, at the originating device, a call session (e.g., voice call session) with a destination device via a wireless communications network, receiving a call confirmation message indicating that the destination device is available to receive the call session, sending a data message (e.g., SMS message) to the destination device, and terminating the call session prior to establishment of a traffic channel between the originating device and the destination device. Initiating the call session may include sending a request to establish the call session with the destination device to the wireless communications network. In embodiments, the request to establish the call session includes an indicator of a real-time message service type. The method may include receiving an acknowledgement message from the destination device indicating that the data message has been received at the destination device. Termination of the call session may include sending a not acknowledgement message to the wireless communications network responsive to receiving a traffic channel setup message from the wireless communications network for establishing a traffic channel for carrying traffic associated with the call session. The originating device and/or the destination device may be a mobile device configured to communicate via the wireless communications network.

Some embodiments are directed to methods for real-time messaging over wireless communication networks that may be performed by an entity of a wireless communication network. In some embodiments, a method for wireless communication includes receiving, at a network node of a wireless communications network serving a destination device, a call session request from an originating device for establishing a call session (e.g., voice call session) with the destination device, where the call session request includes an indicator of a real-time message service type, establishing a connection to the destination device for supporting the call session, receiving a data message (e.g., SMS message) from the originating device for delivery to the destination device, and forwarding the data message to the destination device within the established connection. The method may include transmitting, to the destination device, a call setup message comprising the indicator of the real-time message service type. The method may include receiving, at the destination device, paging signaling corresponding to the request to establish the call session from the wireless communications network, the paging signaling comprising the real-time message service type indicator, and suppressing transmission of alerting messaging to the wireless communications network. The method may include receiving an alerting message from the destination device and suppressing forwarding of the alerting message to the originating device.

Some embodiments include devices for real-time messaging over wireless communication networks. In embodiments, a communications device includes means for initiating a call session (e.g., voice call session) with a destination device via a wireless communications network, means for receiving a call confirmation message indicating that the destination device is available to receive the call session, means for sending a data message (e.g., SMS message) to the destination device, and means for terminating the call session prior to establishment of a traffic channel between the communications device and the destination device. The means for initiating may include means for sending, from the communications device to the wireless communications network, a request to establish the call session with the destination device, the request comprising an indicator of a real-time message service type. The communications device may include means for receiving an acknowledgement message from the destination device indicating that the data message has been received at the destination device. The means for terminating the call session may include means for sending a not acknowledgement message to the wireless communications network responsive to receiving a traffic channel setup message from the wireless communications network for establishing a traffic channel for carrying traffic associated with the call session. The communications device may be a mobile device configured to communicate via the wireless communications network. The destination device may be a mobile device configured to communicate via the wireless communications network.

Some embodiments include systems for real-time messaging over wireless communication networks. In embodiments, a wireless communications system includes means for receiving, at a network node of the wireless communications system, a call session request from an originating device for establishing a call session (e.g., voice call session) with a destination device served by the wireless communications system, where the call session request includes an indicator of a real-time message service type, means for establishing a connection to the destination device for supporting the call session, means for receiving a data message (e.g., SMS message) from the originating device for delivery to the destination device, and means for forwarding the data message to the destination device within the established connection. The wireless communications system may include means for transmitting, to the destination device, a call setup message comprising the indicator of the real-time message service type. The wireless communications system may include means for receiving, at the destination device, paging signaling corresponding to the request to establish the call session from the wireless communications system, the paging signaling comprising the real-time message service type indicator and means for suppressing transmission of alerting messaging to the wireless communications system. The wireless communications system may include means for receiving an alerting message from the destination device and means for suppressing forwarding of the alerting message to the originating device.

Some embodiments include computer program products for sending a data message from an originating device to a destination device. The computer program product may include a non-transitory computer-readable medium that includes code for initiating, by the originating device, a call session (e.g., voice call session) with the destination device via a wireless communications network, code for receiving a call confirmation message indicating that the destination device is available to receive the call session, code for sending the data message (e.g., SMS message) to the destination device, and code for terminating the call session prior to establishment of a traffic channel between the originating device and the destination device. The code for initiating the call session may include code for sending, from the originating device to the wireless communications network, a request to establish the call session with the destination device, the request comprising an indicator of a real-time message service type. The non-transitory computer-readable medium may include code for receiving an acknowledgement message from the destination device indicating that the data message has been received at the destination device. The code for terminating the call session may include code for sending a not acknowledgement message to the wireless communications network responsive to receiving a traffic channel setup message from the wireless communications network for establishing a traffic channel for carrying traffic associated with the call session. The originating device and/or the destination device may be a mobile device configured to communicate via the wireless communications network.

Some embodiments include computer program products for supporting real-time messaging in a wireless communications network. The computer program product may include a non-transitory computer-readable medium that includes code for receiving, at a network node of a wireless communications network serving a destination device, a call session request from an originating device for establishing a call session (e.g., voice call session) with the destination device, where the call session request includes an indicator of a real-time message service type, code for establishing a connection to the destination device for supporting the call session, code for receiving a data message (e.g., SMS message) from the originating device for delivery to the destination device, and code for forwarding the data message to the destination device within the established connection. The non-transitory computer-readable medium may include code for transmitting, to the destination device, a call setup message comprising the indicator of the real-time message service type. The non-transitory computer-readable medium may include code for receiving an alerting message from the destination device, and code for suppressing forwarding of the alerting message to the originating device.

Some embodiments include devices for real-time messaging over wireless communication networks that include at least one processor configured to initiate a call session (e.g., voice call session) with a destination device via a wireless communications network, receive a call confirmation message indicating that the destination device is available to receive the call session, send a data message (e.g., SMS message) to the destination device, and terminate the call session prior to establishment of a traffic channel between the communications device and the destination device. The at least one processor may be further configured to send, from the communications device to the wireless communications network, a request to establish the call session with the destination device. The request to establish the call session with the destination device may include an indicator of a real-time message service type. The at least one processor may be configured to receive an acknowledgement message from the destination device indicating that the data message has been received at the destination device. The at least one processor may be configured to send a not acknowledgement message to the wireless communications network responsive to receiving a traffic channel setup message from the wireless communications network for establishing a traffic channel for carrying traffic associated with the call session. The communications device may be a mobile device configured to communicate via the wireless communications network. The destination device may be a mobile device configured to communicate via the wireless communications network.

Some embodiments include a wireless communications system for real-time messaging that includes at least one processor configured to receive, at a network node of the wireless communications system, a call session request from an originating device for establishing a call session (e.g., voice call session) with a destination device served by the wireless communications system, where the call session request includes including an indicator of a real-time message service type, establish a connection to the destination device for supporting the call session, receive a data message (e.g., SMS message) from the originating device for delivery to the destination device, and forward the data message to the destination device within the established connection. The at least one processor may be configured to transmit, to the destination device, a call setup message comprising the indicator of the real-time message service type. The at least one processor may be configured to receive an alerting message from the destination device and suppress forwarding of the alerting message to the originating device.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments, it should be understood that such exemplary embodiments can be implemented in various devices, systems, and methods.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
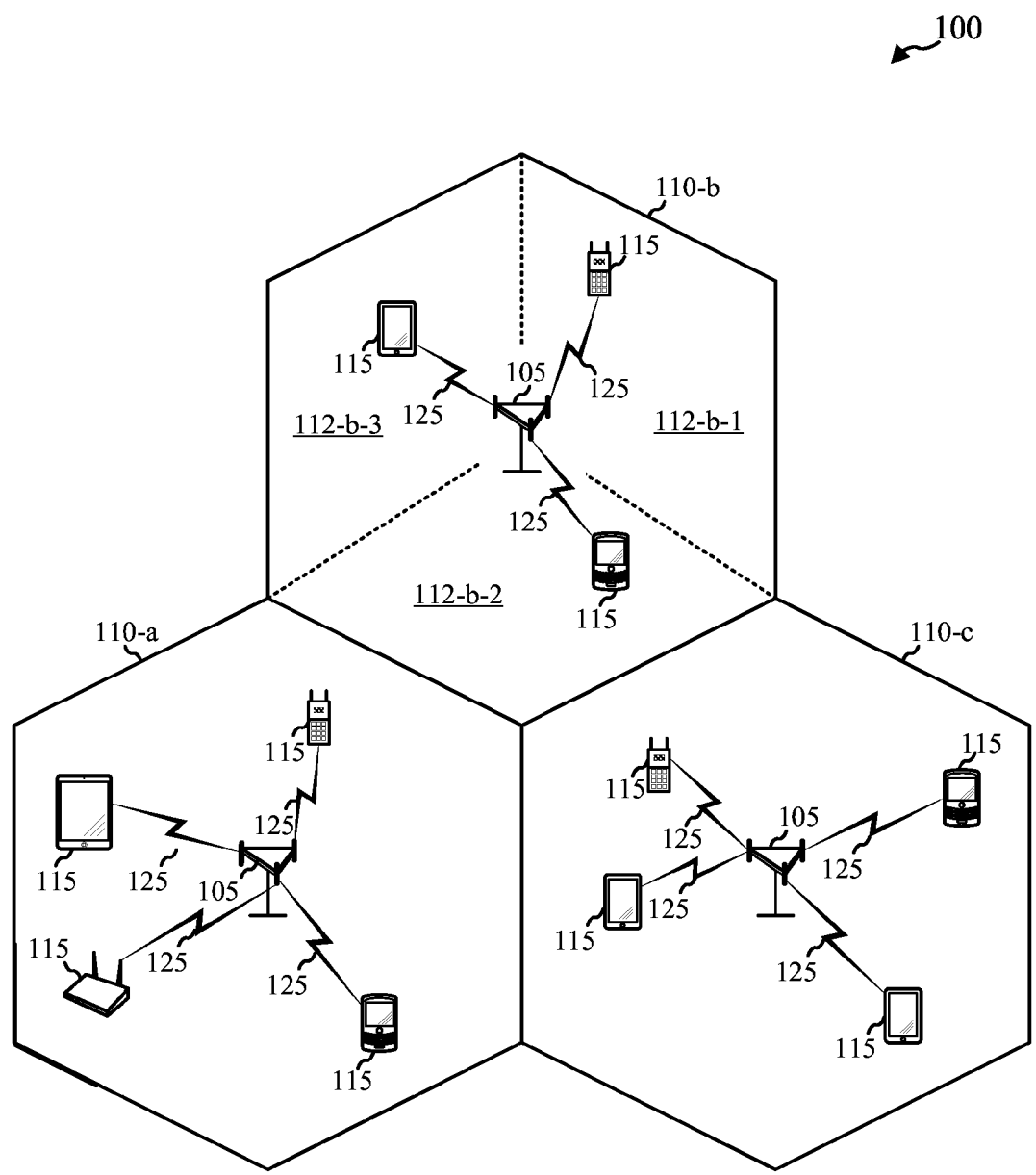
FIG. 1 shows a block diagram of a wireless communications system in accordance with various embodiments.
Figure 1:
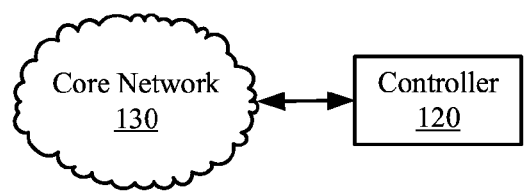

Methods, systems, and devices are described for providing real-time Short Message Service (SMS) messaging between an originating device such as a mobile device or Short Message Entity (SME) and a destination device such as a mobile device or SME. The real-time SMS messaging may be provided by initiating a call session between the originating device and the destination device, sending the SMS message within the call session, and terminating the call session prior to establishment of dedicated call traffic resources. An originating device for a real-time SMS message may initiate the call session by sending a call session setup message to the network. The call session setup message may indicate, for example, that the originating device is attempting to set up a voice call with the destination device. The network may page the destination device or otherwise determine whether the destination device is available to answer the call. The SMS message may be sent when the originating device receives a call confirmation that the destination device is available to answer the call. The call session may then be terminated prior to establishment of traffic channels and/or traffic radio bearers associated with the initiated call session.

In some embodiments, existing mobile protocol stacks may be employed to provide real-time SMS messaging by using voice call setup procedures to establish a call session between an originating device and a destination device before sending the SMS message. Messaging procedures may then be used to send the SMS message and receive an acknowledgement that the SMS message has been received by the destination device. The call session may be terminated before establishment of a traffic channel for the call.

In some embodiments, call session protocol stacks are extended to provide for an indication of a real-time SMS session type in the call session setup signaling between the originating device, the network, and/or the destination device. In these embodiments, an originating device may send a call setup message to the network and indicate in the message that the reason for the call setup is to send a real-time SMS to the destination device. The network may indicate in call setup messaging to the destination device that the reason for call setup is a real-time SMS message. Real-time SMS messaging may be offered as a value added service, according to various embodiments.

Techniques described herein may be used for various wireless communications systems such as cellular wireless systems, Peer-to-Peer wireless communications, wireless local access networks (WLANs), ad hoc networks, satellite communications systems, and other systems. The terms "system" and "network" are often used interchangeably. These wireless communications systems may employ a variety of radio communication technologies such as Code Division Multiple Access (CDMA), Time Division Multiple Access (TDMA), Frequency Division Multiple Access (FDMA), Orthogonal FDMA (OFDMA), Single-Carrier FDMA (SC-FDMA), and/or other radio technologies. Generally, wireless communications are conducted according to a standardized implementation of one or more radio communication technologies called a Radio Access Technology (RAT). A wireless communications system or network that implements a Radio Access Technology may be called a Radio Access Network (RAN).

Examples of Radio Access Technologies employing CDMA techniques include CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. Examples of TDMA systems include various implementations of Global System for Mobile Communications (GSM). Examples of Radio Access Technologies employing OFDM and/or OFDMA include Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a block diagram illustrates an example of a wireless communications system 100 in accordance with various embodiments. The system 100 includes base stations 105, mobile devices 115, a base station controller 120, and a core network 130 (the functions of controller 120 may be integrated into the core network 130 and/or base stations 105, in some embodiments). The system 100 may support operation on multiple carriers (waveform signals of different frequencies). Multi-carrier transmitters can transmit modulated signals simultaneously on the multiple carriers. For example, each modulated signal may be a multi-carrier channel modulated according to the various radio technologies described above. Each modulated signal may be sent on a different carrier and may carry control information (e.g., pilot signals, control channels, etc.), overhead information, data, etc. The system 100 may be a multi-carrier network capable of efficiently allocating network resources.

The base stations 105 may wirelessly communicate with the devices 115 via a base station antenna (not shown). The base stations 105 may communicate with the devices 115 under the control of the base station controller 120 via multiple carriers. Each of the base station 105 sites may provide communication coverage for a respective geographic area. In some embodiments, base stations 105 may be referred to as a base transceiver station (BTS), a radio base station, an access point, a radio transceiver, a NodeB, eNodeB (eNB), Home NodeB, a Home eNodeB, or some other suitable terminology. The coverage area for each base station 105 here is identified as 110-$a$, 110-$b$, or 110-$c$. The coverage area for a base station may be divided into sectors making up only a portion of the coverage area (e.g., sectors 112-$b$-1, 112-$b$-2, 112-$b$-3, etc.). The system 100 may include base stations 105 of different types (e.g., macro, micro, and/or pico base stations). There may be overlapping coverage areas for different technologies. A macro base station may provide communication coverage for a relatively large geographic area (e.g., 35 km in radius). A pico base station may provide coverage for a relatively small geographic area (e.g., 12 km in radius), and a femto base station may provide communication coverage for a relatively smaller geographic area (e.g., 50 m in radius). There may be overlapping coverage areas for different technologies.

The devices 115 may be dispersed throughout the coverage areas 110. Each device 115 may be stationary or mobile. In one configuration, the devices 115 may be able to communicate with different types of base stations such as, but not limited to, macro base stations, pico base stations, and femto base stations, via link 125. The devices 115 may be referred to as mobile stations, mobile devices, access terminals (ATs), user equipments (UEs), subscriber stations (SSs), or subscriber units. The devices 115 may include cellular phones and wireless communications devices, but may also include personal digital assistants (PDAs), other handheld devices, netbooks, notebook computers, tablet computers, entertainment devices, televisions, smart phones, and in some scenarios stationary communication devices, etc. Thus, the term mobile device should be interpreted broadly hereinafter, including the claims, to include any type of wireless or mobile communications device.

In one example, the network controller 120 may be coupled to a set of base stations and provide coordination and control for these base stations 105. The controller 120 may communicate with the base stations 105 via a backhaul (e.g., core network 130). The base stations 105 may also communicate with one another directly or indirectly and/or via wireless or wireline backhaul.

System 100 shows transmissions 125 between mobile devices 115 and base stations 105. The transmissions 125 may include uplink (UL) and/or reverse link transmission, from a mobile device 115 to a base station 105, and/or downlink (DL) and/or forward link transmissions, from a base station 105 to a mobile device 115. Logical control channels may include a broadcast control channel (BCCH), which is the downlink channel for broadcasting system control information, a paging control channel (PCCH), which is the downlink channel that transfers paging information, a multicast control channel (MCCH), which is a point-to-multipoint downlink channel used for transmitting multimedia broadcast and multicast service (MBMS) scheduling and control information for one or several multicast traffic channels (MTCHs). Generally, after establishing radio resource control (RRC) connection, MCCH is only used by the user equipments that receive MBMS. Dedicated control channel (DCCH) is another logical control channel that is a point-to-point bi-directional channel transmitting dedicated control information, such as user-specific control information used by the user equipment having an RRC connection. Common control channel (CCCH) is also a logical control channel that may be used for random access information. Logical traffic channels may comprise a dedicated traffic channel (DTCH), which is a point-to-point bi-directional channel dedicated to one user equipment for the transfer of user information. Also, a multicast traffic channel (MTCH) may be used for point-to-multipoint downlink transmission of traffic data.

The communication networks that accommodate some of the various embodiments may additionally include logical transport channels that are classified into downlink (DL) and uplink (UL). The DL transport channels may include a broadcast channel (BCH), a downlink shared data channel (DL-SDCH), a multicast channel (MCH) and a Paging Channel (PCH). The UL transport channels may include a random access channel (RACH), a request channel (REQCH), an uplink shared data channel (UL-SDCH) and a plurality of physical channels. The physical channels may also include a set of downlink and uplink channels.

In some disclosed embodiments, the downlink physical channels may include at least one of a common pilot channel (CPICH), a synchronization channel (SCH), a common control channel (CCCH), a shared downlink control channel (SDCCH), a multicast control channel (MCCH), a shared uplink assignment channel (SUACH), an acknowledgement channel (ACKCH), a downlink physical shared data channel (DL-PSDCH), an uplink power control channel (UPCCH), a paging indicator channel (PICH), a load indicator channel (LICH), a physical broadcast channel (PBCH), a physical control format indicator channel (PCFICH), a physical downlink control channel (PDCCH), a physical hybrid ARQ indicator channel (PHICH), a physical downlink shared channel (PDSCH) and a physical multicast channel (PMCH). The uplink physical channels may include at least one of a physical random access channel (PRACH), a channel quality indicator channel (CQICH), an acknowledgement channel (ACKCH), an antenna subset indicator channel (ASICH), a shared request channel (SREQCH), an uplink physical shared data channel (UL-PSDCH), a broadband pilot channel (BPICH), a physical uplink control channel (PUCCH) and a physical uplink shared channel (PUSCH).

Figure 2:
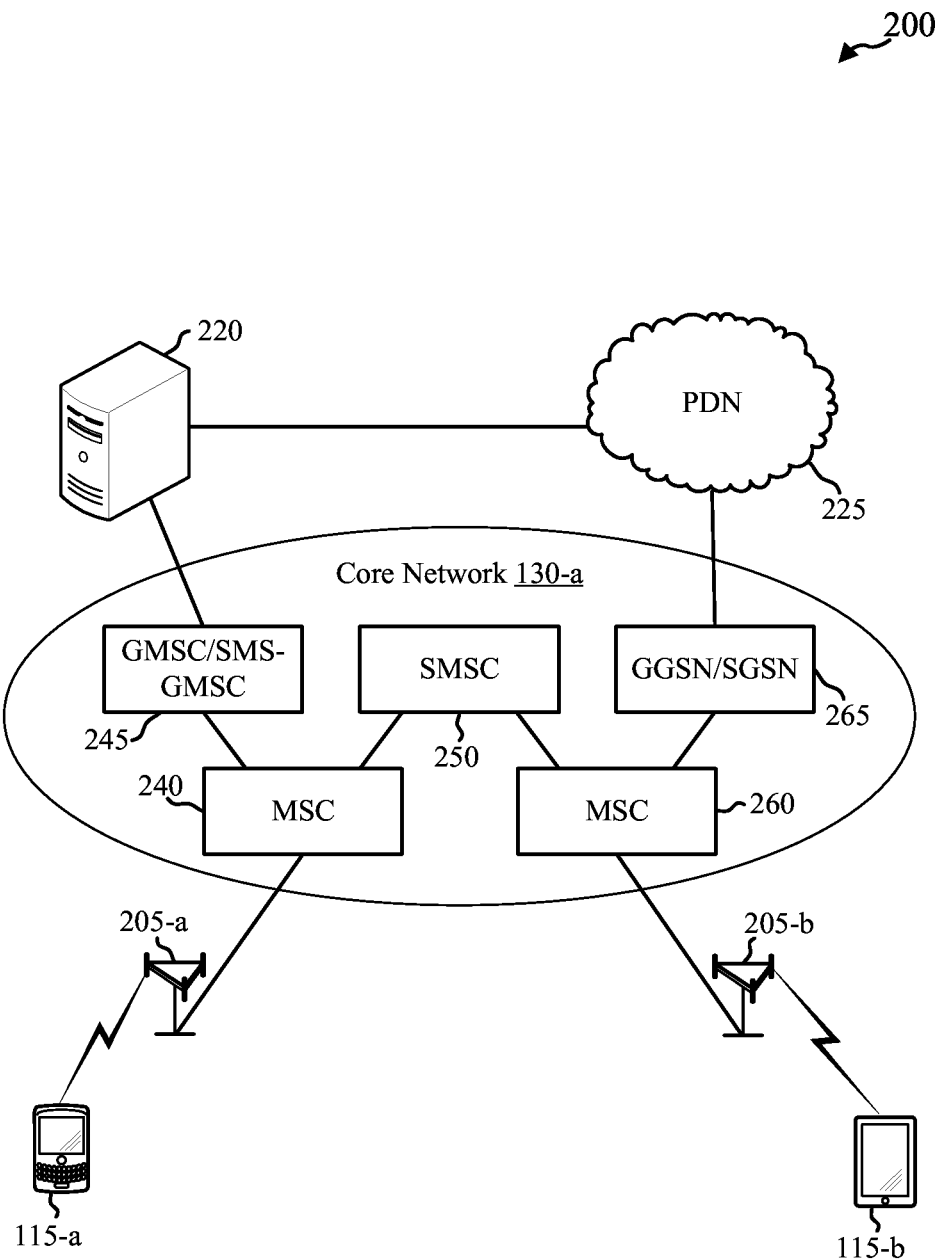
FIG. 2 shows a block diagram of a wireless communications system in accordance with various embodiments.

FIG. 2 illustrates an example of a UMTS and/or GSM wireless communications system 200 in accordance with various embodiments. System 200 may include a core network 130-*a* connected to one or more network cells 205. Core network 130-*a* may include one or more Mobile Switching Centers (MSCs) 240 and/or 260, Gateway MSC/SMS-Gateway MSC (GMSC/SMS-GMSC) 245, Short Message Service Center (SMSC) 250, and/or Gateway General Packet Radio Services (GPRS) Support Node/Serving GPRS Support Node (GGSN/SGSN) 260. System 200 may include one or more Packet Data Networks (PDNs) 225 connected to core network 130-*a*. PDN 225 may include operator IP Networks as well as external IP Networks such as the Internet. PDN 225 may connect to core network 130-*a* through GGSN/SGSN 265.

As illustrated in FIG. 2, system 200 includes a first network cell 205-*a* and a second network cell 205-*b*. Network cells 205-*a* and/or 205-*b* may be examples of aspects of GSM and/or UMTS Radio Access Networks providing an air interface for mobile devices 115. For example, a GSM network cell 205 may include a base station subsystem (BSS) which may include a base station controller (BSC), one or more BTSs, and/or other components. A UMTS network cell 205 may include a radio network controller (RNC) and one or more Node-Bs, and/or other components.

System 200 may include a Short Message Entity (SME) 220. SME 220 may also be called an External Short Message Entity (ESME). SME 220 may communicate with GMSC/SMS-GMSC 245 of network 130 through various networks such as a Public Switched Telephone Network (PSTN), an Integrated Services Digital Network (ISDN), and/or other connections with network 130 using various signaling protocols including Signaling System 7 (SS7), Short Message Peer-to-Peer (SMPP), and/or other protocols.

Systems 100 and/or 200 may support conventional SMS messaging using a store-and-forward architecture through SMSC 250. In the store-and-forward architecture, sending an SMS message from an originating device and delivery of the SMS to the destination device are separate and unsynchronized operations. When a user (e.g., using a mobile device 115 and/or SME 220, etc.) sends an SMS message to another user (e.g., another mobile device 115 and/or SME 220, etc.), the SMS message is not routed directly to the destination user, but is instead routed to the SMSC 250. The SMSC 250 stores the message until the network 130, in a separate and unsynchronized operation, determines that the destination user is available to accept the message. The SMSC 250 can then forward the message to the destination user.

Consider that mobile device 115-*a* sends a traditional SMS message to mobile device 115-*b*. First, the mobile device 115-*a* requests resources from network cell 205-*a* to send the SMS message. The network cell 205-*a* typically will allocate control channel resources (e.g., SDCCH, etc.) for transmission of the SMS message from the mobile device 115-*a* to the network cell 205-*a*. Upon receiving the SMS message at the network cell 205-a, the SMS message is then routed through MSC 240 to SMSC 250, where it is stored for delivery to the destination mobile device 115-b when the destination device is available. In a separate and unsynchronized operation, the core network 130 (via MSC 260 and/or network cell 205-b) may determine that the destination mobile device 115-b is available for receiving SMS messages. MSC 260 and/or network cell 205-b may indicate to SMSC 250 that the destination mobile device 115-b is available to receive the message, set up resources (e.g., control channel resources, etc.) for transmitting the SMS message to the destination mobile device 115-b, and then SMSC 250 may forward the message to the destination mobile device 115-b through MSC 260 and/or network cell 205-b.

Because sending the SMS message by the originating device is a separate and unsynchronized operation to SMS message delivery at the destination device, there may be a delay of several seconds up to several hours or more between when the originating device sends the SMS message and delivery of the SMS message to the destination device. In addition, the originating device does not receive confirmation that the SMS is received by the destination device.

The different aspects of systems 100 and/or 200, such as the mobile devices 115, the base stations 105, the core network 130, and/or the controller 120 may be configured to provide real-time SMS messaging between an originating device such as a mobile device 115 or SME 220 and a destination device such as a mobile device 115 or SME 220. The real-time SMS messaging may be provided by initiating a call session between the originating device and the destination device through core network 130, sending the SMS message within the call session, and terminating the call session prior to establishment of dedicated call traffic resources. An originating device for a real-time message may initiate the call session by sending a call session setup message to the network 130. The call session setup message may indicate, for example, that the originating device is attempting to set up a voice call with the destination device. The network may page the destination device or otherwise determine whether the destination device is available to answer the call. The SMS message may be sent when the originating device receives a call confirmation that the destination device is available to answer the call. The call session may then be terminated prior to establishment of traffic radio bearers and/or traffic channels associated with the call session.

In some embodiments, existing mobile protocol stacks may be employed to provide real-time messaging by using voice call setup procedures to establish a call session between an originating device and a destination device before sending the SMS message. Messaging procedures may then be used to send the SMS message and receive an acknowledgement that the SMS message has been received by the destination device. The call session may be terminated before establishment of a traffic channel for the call.

In some embodiments, call session protocol stacks are extended to provide for an indication of a real-time SMS session type in the call session setup messaging between the originating device, the network, and/or the destination device. In these embodiments, an originating device may send a call setup message to the network and indicate in the message that the reason for the call setup is to send a real-time SMS to the destination device. The network may indicate in paging and/or call session setup messaging to the destination device that the reason for call setup is a real-time SMS message. Real-time SMS messaging may be offered as a value added service, according to various embodiments.

Figure 3:
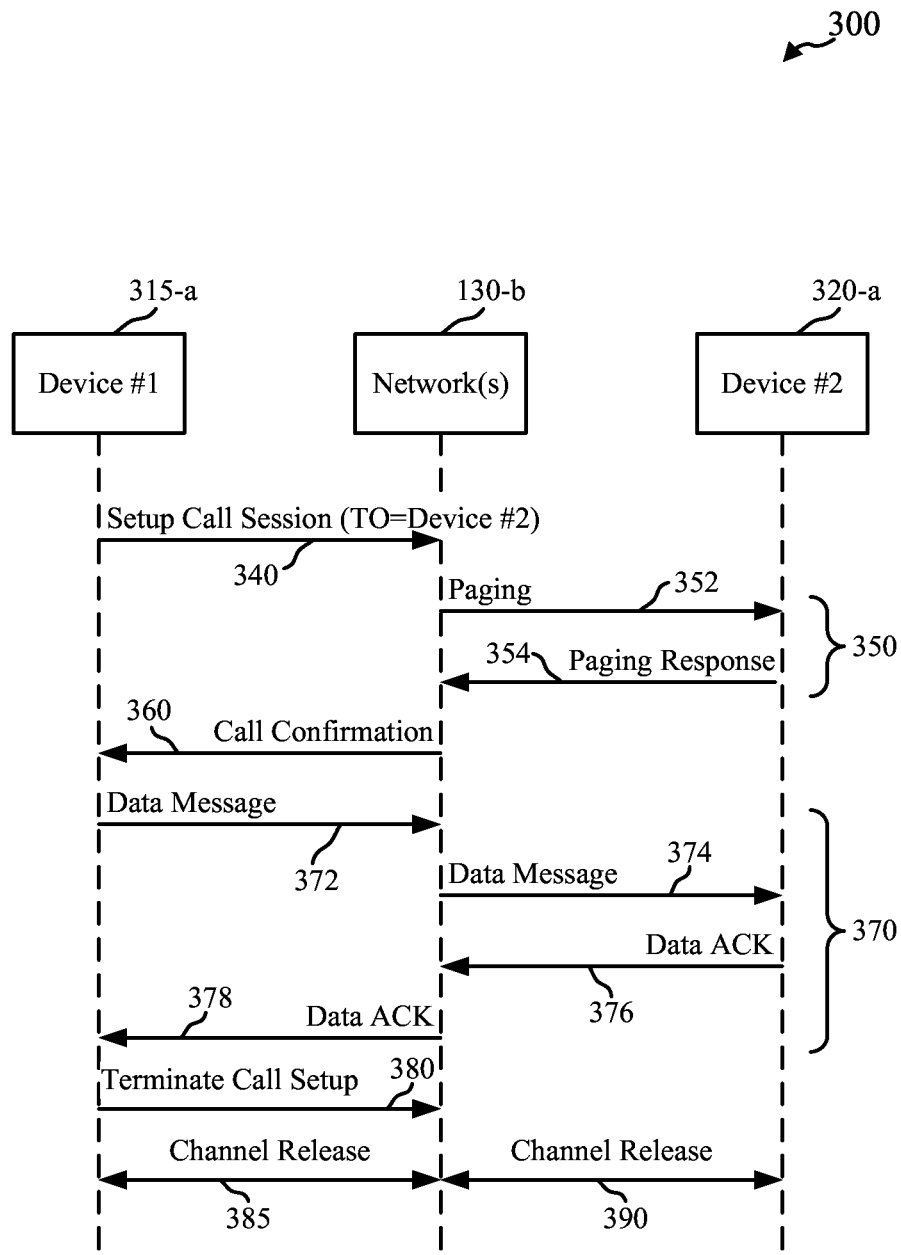
FIG. 3 shows a signaling flow for real-time SMS delivery over existing mobile protocol stacks in accordance with various embodiments.

FIG. 3 illustrates a signaling flow 300 for real-time SMS delivery over existing mobile protocol stacks in accordance with various embodiments. In signaling flow 300, an originating device 315-a sends a real-time SMS to a destination device 320-a by initiating a call session with the destination device 320-a through a core network 130-b before sending the SMS message. The destination device 320-a may be a mobile device 115 connected to core network 130-b. The originating device 315-a may be a mobile device 115 connected to core network 130-b, a mobile device 115 of another network (e.g., a different radio access network, the wireless network of another carrier, etc.), or a non-mobile device or entity (e.g., SME 220, etc.) connected to network 130-b directly or through other networks (e.g., PDN 225, etc.). Where the originating device 315-a and destination device 320-a are associated with different networks, core network 130-b may represent aspects of each network. For these instances, communication between networks is omitted for clarity.

In signaling flow 300, the originating device 315-a may be programmed or instructed (through an application layer, user prompts, etc.) to send a real-time SMS to the destination device 320-a. The originating device 315-a may initiate a call session with the destination device by sending call session setup message 340 to the network 130-b. The call session setup message 340 may indicate that the originating device 315-a is requesting a voice call service type. The call session setup message 340 may include other information such as information identifying the originating device 315-a, capabilities of the originating device 315-a, an address (e.g., phone number, etc.) for the destination device 320-a, and/or other information. The network 130-b may perform authentication and/or other operations to determine whether the originating device 315-a is authorized to access the network 130-b and initiate the call session.

The network 130-b may perform a paging operation 350 to locate and confirm that the destination device 320-a is available to answer the call. The paging operation 350 may include sending paging messaging 352 by the network 130-b and receiving paging response 354 at the network 130-b from the destination device 320-a. The network 130-b may send a call confirmation message 360 to the originating device 315-a indicating that the destination device 320-a has been successfully paged.

Upon receiving call confirmation message 360, the originating device 315-a may send the SMS message to the destination device 320-a as shown by data message operation 370. The originating device 315-a may send the SMS message in a data message 372 using existing SMS message protocol signaling. Because the network 130-b has paged the destination device 320-a and received a paging response, the network 130-b may have a connection state established with the destination device 320-a (e.g., RRC connection, etc.) that allows the SMS message to be sent to the destination device 320-a in data message 374 without the delay that might otherwise occur in the store-and-forward mechanism of traditional SMS messaging.

The destination device 320-a may acknowledge receiving the SMS message by sending an acknowledgement message 376 to the network 130-b. The network 130-b may send an acknowledgement message 378 to the originating device 315-a. The acknowledgement message 378 may acknowledge that the SMS message has been received by the network 130-b. In embodiments, the network 130-b may send acknowledgement message 378 to the originating device 315-a upon receiving acknowledgement message 376 from the destination device 320-a. In this case, acknowledgement message 378 may indicate to the originating device 315-*a* that the SMS message has been received by the destination device 320-*a*.

Call session setup may then be terminated at step 380. Signaling messages 385 and 390 indicate that signaling channels set up during signaling flow 300 may then be released. Notably, termination of call session setup may be performed prior to establishment of traffic radio bearers and/or traffic channels between the network 130-*b* and the originating device 315-*a* and/or the destination device 320-*a*. In this way, the call session setup process illustrated in signaling flow 300 may be performed without consuming traffic channel resources of the network 130-*b*. In some embodiments, the originating device 315-*a* may terminate call session setup by sending a message 380 that terminates call session setup. For example, the originating device 315-*a* may send a not acknowledgment (NACK) message in response to a traffic radio bearer setup message and/or traffic channel setup message from network 130-*b*. In some embodiments, call session setup may be terminated without explicit termination signaling by the originating device 315-*a* or the network 130-*b*. For example, the originating device 315-*a* may not respond to traffic radio bearer setup messaging and/or traffic channel setup messaging from network 130-*b*, which may cause the network 130-*b* to release established signaling channels as illustrated by arrows 385 and/or 390.

In embodiments, signaling flow 300 bypasses the store-and-forward mechanism of traditional SMS messaging. For example, the network 130-*b* may route the SMS message to the destination device 320-*a* without the SMS message going through an SMSC. In other embodiments, the SMS message may go through the SMSC, but forwarding may be performed from the SMSC without substantial delay because the network 130-*b* has an established signaling connection with the destination device 320-*a*. As such, signaling flow 300 may provide almost immediate or real-time delivery of the SMS message.

Figure 4:
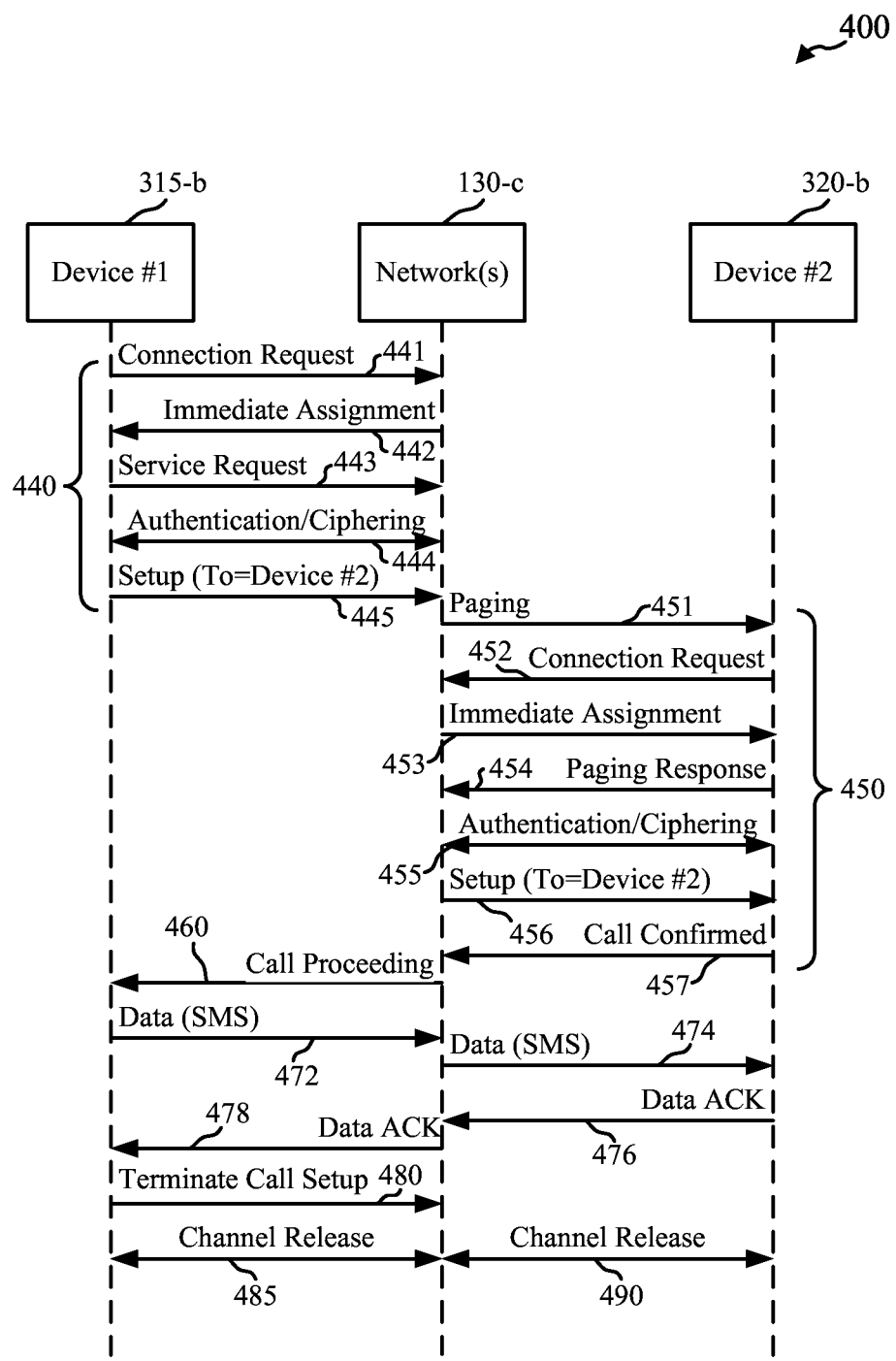
FIG. 4 shows a signaling flow for real-time SMS delivery over existing GSM and/or UMTS protocol stacks in accordance with various embodiments.

FIG. 4 illustrates an example of a signaling flow 400 for real-time SMS delivery over existing GSM and/or UMTS protocol stacks in accordance with various embodiments. In signaling flow 400, an originating device 315-*b* sends a real-time SMS to a destination device 320-*b* by establishing a call session with the destination device 320-*b* through a GSM or UMTS core network 130-*c* before sending the SMS message. Core network 130-*c* illustrated in signaling flow 400 may represent aspects of one or more core networks associated with one or more radio access technologies. The destination device 320-*b* may be a mobile device 115 connected to network 130-*c*. The originating device 315-*b* may be a mobile device 115 connected to network 130-*c*, a mobile device 115 of another network (e.g., the wireless network of another carrier, etc.), or a non-mobile device or entity (e.g., SME 220, etc.) connected to network 130-*c* directly or through other networks (e.g., PDN 225, etc.). In one example, signaling flow 400 illustrates real-time SMS delivery for an SMS message sent from mobile device 115-*a* to mobile device 115-*b* through GSM/UMTS core network 130-*a* as illustrated in FIG. 2.

In signaling flow 400, the originating device 315-*b* may be programmed or instructed (through an application layer, user prompts, etc.) to send a real-time SMS to the destination device 320-*b*. The originating device 315-*b* may initiate a call session with the destination device 320-*b* as illustrated by messaging sequence 440. Messaging sequence 440 may include connection request message 441 from originating device 315-*b* to network 130-*c*. Network 130-*c* may assign resources for the connection by sending immediate assignment message 442. Immediate assignment message 442 may assign control channel resources (e.g., SDCCH, etc.) for the originating device 315-*b* to perform call session setup. The originating device 315-*b* may send a service request message 443 to the network 130-*b* using the assigned resources. Service request message 443 may indicate that originating device 315-*b* is requesting establishment of a voice call. The network 130-*c* may perform authentication and/or ciphering 444 for originating device 315-*b*. After authentication and/or ciphering 444, the originating device 315-*b* may send call setup message 445 to the network 130-*c*, which may include a reason code indicating a call session and addressing information for the destination device 320-*b*.

The network 130-*c* may perform a paging operation 450 to locate and confirm that the destination device 320-*b* is available to answer the call. The paging operation 450 may include sending paging messaging 451 by the network 130-*c* and receiving a connection request message 452 at the network 130-*c* from the destination device 320-*b*. The network 130-*c* may assign resources (e.g., DCCH, etc.) for the destination device 320-*c* using immediate assignment message 453 and the destination device 320-*b* may send paging response 454 to network 130-*c*. After authentication/ciphering 455, the network 130-*c* may send setup message 456 to the destination device 320-*b*. Setup message 456 may indicate to the destination device 320-*b* that the network has an incoming call from the originating device 315-*b*. The destination device 320-*b* may respond by confirming receipt of the call setup message using call confirmation message 457. After paging operation 450, the destination device 320-*b* may be in a call confirmed call state.

The network 130-*c* may then send a call proceeding message 460 to the originating device 315-*b* indicating that the destination device 320-*b* has been successfully paged and confirmed the call session. Upon receiving call proceeding message 460, the originating device 315-*b* may send an SMS message in a data message 472 using existing SMS message protocol signaling. Similarly to signaling flow 300, the SMS message may be sent to the destination device 320-*b* in data message 474 without the delay that might otherwise occur in the store-and-forward mechanism of traditional SMS messaging.

The destination device 320-*b* may acknowledge receiving the SMS message by sending an acknowledgement message 476 to the network 130-*c*. The network 130-*c* may send an acknowledgement message 478 to the originating device 315-*a*. Similarly to signaling flow 300, the acknowledgement message 478 may acknowledge that the SMS message has been received by the network 130-*c* and/or the destination device 320-*b*.

Call session setup may then be terminated at step 480. Signaling messages 485 and 490 indicate that signaling channels set up during signaling flow 400 may then be released. Notably, termination of call setup may be performed prior to establishment of traffic radio bearers and/or traffic channels between the network 130-*c* and the originating device 315-*b* and/or the destination device 320-*b*. In this way, the call session setup process illustrated in signaling flow 400 may be performed without consuming traffic channel resources of the network 130-*c*. In some embodiments, the originating device 315-*b* may terminate call session setup by sending a message 480 that terminates call session setup. For example, the originating device 315-*b* may send a not acknowledgment (NACK) message in response to a traffic radio bearer setup message and/or traffic channel setup message from network 130-*c*. In some embodiments, call session setup may be terminated without explicit termination signaling by the originating device 315-*b* or the network 130-*c*. For example, the originating device 315-*b* may not respond to traffic radio bearer setup messaging and/or traffic channel setup messaging from network 130-*c*, which may cause the network 130-*c* to release established signaling channels (e.g., DCCH, SDCCH, etc.) as illustrated by arrows 485 and/or 490.

While signaling flow 400 illustrates operation of real-time SMS delivery over GSM and/or UMTS networks, one of skill in the art will appreciate that the disclosed techniques may be readily extended to other types of networks. For example, sequences similar to signaling flow 400 may be used for mobile originated and/or mobile terminated real-time SMS delivery in networks using other radio technologies (e.g., CDMA, LTE/LTE-A networks, etc.). In an LTE/LTE-A network, for example, an originating device may establish an RRC connection with the network 130 and send a service request message to initiate the call session. The originating device may receive a call proceeding message indicating that the destination device has been paged and then send the SMS message to the destination device. The originating device may then terminate call setup prior to establishing traffic channels (e.g., prior to activation of bearers for user data) between the originating and destination device.

Notably, sequences similar to signaling flows 300 and/or 400 may be used where the originating device 315 and/or destination device 320 are connected to different networks using the same or different RATs. Additionally, similar sequences may be used where the originating device 315 and/or destination device 320 is a non-mobile device (e.g., SME 220, etc.) connected to the network. For example, similar signaling flows may be used where the destination device is a mobile device 115 in communication with a network and the originating device is an SME on the same or a different network.

Referring back to FIG. 2, sequences similar to signaling flows 300 and/or 400 may be used to send a real-time SMS from SME 220 to mobile device 115-*a* and/or mobile device 115-*b*. For these instances, SME 220 may use one or more protocols for voice and SMS signaling (e.g., SS7, SMPP, etc.) through Public Switched Telephone Network (PSTN), Integrated Services Digital Network (ISDN), and/or PDN connections with network 130 that generally correspond to the signaling messages between the originating devices 315-*a* and/or 315-*b* and the network 130 illustrated in signaling flows 300 and/or 400. For example, SME 220 may use SS7, SMPP, and/or other voice and messaging protocols to send a real-time SMS to a destination device such as mobile device 115-*a* and/or mobile device 115-*b* by initiating a call session with the destination device, receiving a call confirmation message indicating that the destination device has been paged and/or confirmed the call session, sending the SMS message, and terminating the call session.

Still referring to FIG. 2, sequences similar to signaling flows 300 and/or 400 may be used to send a real-time SMS from a mobile device 115 to SME 220. In these instances, signaling from the network 130-*a* to SME 220 may be performed using signaling generally corresponding to the signaling messages between the network 130 and destination devices 320 illustrated in signaling flows 300 and/or 400.

Figure 5:
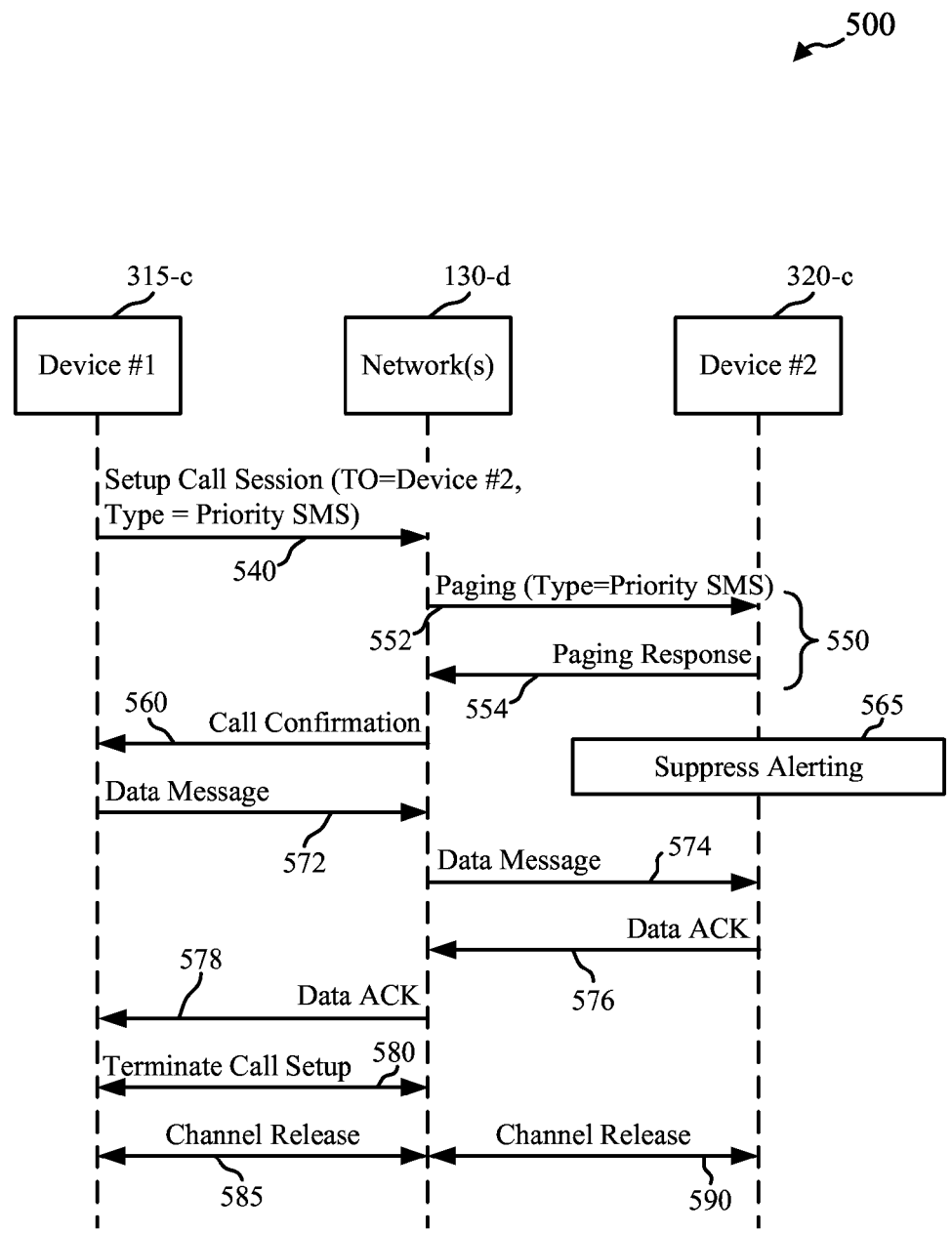
FIG. 5 shows a signaling flow for real-time SMS delivery using a real-time SMS indication for call session setup in accordance with various embodiments.

FIG. 5 illustrates a signaling flow 500 for real-time SMS delivery using a real-time SMS indication for call session setup in accordance with various embodiments. In signaling flow 500, an originating device 315-*c* sends a real-time SMS to a destination device 320-*c* by initiating a call session with the destination device 320-*c* through a core network 130-*d* before sending the SMS message. The destination device 320-*c* may be a mobile device 115 connected to network 130-*d*. The originating device 315-*c* may be a mobile device 115 connected to network 130-*d*, a mobile device 115 of another network (e.g., a different radio access network, the wireless network of another carrier, etc.), or a non-mobile device or entity (e.g., SME 220, etc.) connected to network 130-*d* directly or through other networks (e.g., PDN 225, etc.). Where the originating device 315-*c* and destination device 320-*c* are associated with different networks, core network 130-*d* may represent aspects of each network. For these instances, communication between networks is omitted for clarity.

In signaling flow 500, the originating device 315-*c* may be programmed or instructed (through an application layer, user prompts, etc.) to send a real-time SMS to the destination device 320-*c*. The originating device 315-*c* may initiate a call session with the destination device by sending a call session setup message 540 to the network 130-*d*. The call session setup message 540 may indicate that the originating device 315-*c* is requesting a voice call service type. The call session setup message 540 may additionally include a reason for the call session as related to a real-time SMS message. The call session setup message 540 may include other information such as information identifying the originating device 315-*c*, capabilities of the originating device 315-*c*, an address (e.g., phone number, etc.) for the destination device 320-*c*, and/or other information. The network 130-*d* may perform authentication and/or other operations to determine whether the originating device 315-*c* is authorized to access the network 130-*d* and initiate the call session.

The network 130-*d* may perform a paging operation 550 to locate and confirm that the destination device 320-*c* is available to answer the call. The paging operation 550 may include sending paging messaging 552 by the network 130-*d* and receiving paging response 554 at the network 130-*d* from the destination device 320-*c*. Paging message 552 may include an indication to the destination device 320-*c* that the reason for call setup is a real-time SMS. Because the destination device 320-*c* has received the real-time SMS reason indication in the paging messaging, the destination device 320-*c* may suppress various operations and/or messaging that may typically be associated with preparing to receive a mobile-terminated call session. In the example illustrated in signaling flow 500, the destination device 320-*c* suppresses alerting messaging at block 565. Based on the real-time SMS type indicator, the network and/or destination device 320-*c* may suppress other operations or messaging such as messaging associated with traffic radio bearer setup and/or traffic channel assignment.

Upon successful paging of destination device 320-*c*, the network 130-*d* may send a confirmation message 560 to the originating device 315-*c* indicating that the destination device 320-*c* has been successfully paged. The originating device 315-*c* may then send the SMS message to the destination device 320-*c* as shown by message operation 570. The originating device 315-*c* may send the SMS message in a data message 572 using existing SMS message protocol signaling. Because the network 130-*d* has paged the destination device 320-*c* and received a paging response, the network 130-*d* may have a connection state established with the destination device 320-*c* (e.g., RRC connection, etc.) that allows the SMS message to be sent to the destination device 320-*c* in data message 574 without the delay that might otherwise occur in the store-and-forward mechanism of traditional SMS messaging.

The destination device 320-*c* may acknowledge receiving the SMS message by sending an acknowledgement message 576 to the network 130-*d*. The network 130-*d* may send an acknowledgement message 578 to the originating device 315-*c*. The acknowledgement message 578 may acknowledge that the SMS message has been received by the network 130-*d*. In embodiments, the network 130-*d* may send acknowledgement message 578 to the originating device 315-*c* upon receiving acknowledgement message 576 from the destination device 320-*c*. In this case, acknowledgement message 578 may indicate to the originating device 315-*c* that the SMS message has been received by the destination device 320-*c*.

Call session setup may be terminated at step 580. Signaling messages 585 and 590 indicate that signaling channels set up during signaling flow 500 may then be released. Notably, termination of call setup may be performed prior to establishment of traffic radio bearers and/or traffic channels between the network 130-*d* and the originating device 315-*c* and/or the destination device 320-*c*. In this way, the call session setup process illustrated in signaling flow 500 may be performed without consuming traffic channel resources of the network 130-*d*. In some embodiments, call session setup may be terminated by the originating device 315-*c*. For example, the originating device 315-*c* may not respond to traffic radio bearer setup messaging and/or traffic channel setup messaging from network 130-*d*, or the originating device 315-*c* may send a not acknowledgment (NACK) message in response to traffic radio bearer setup messaging and/or traffic channel setup messaging from network 130-*d*. In some embodiments, call session setup may be terminated by the network 130-*d*. For example, the network 130-*d* may send a message that indicates that the call session is to be terminated without traffic radio bearer setup and/or traffic channel setup. In some embodiments, call session setup is terminated at step 580 without explicit termination signaling by either the originating device 315-*c* or the network 130-*d*. Because the originating device 315-*c* initiated the call session with a reason code indicating that the call session is related to a real-time SMS message, the originating device 315-*c*, the network 130-*d*, and/or the destination device 320-*c* may release the established call session channels as indicated by arrows 585 and 590 without transmitting and/or receiving an explicit call session termination at step 580.

In embodiments, signaling flow 500 bypasses the store-and-forward mechanism of traditional SMS messaging. For example, the network 130-*d* may route the SMS message to the destination device 320-*c* without the SMS message going through the SMSC. In other embodiments, the SMS message may go through the SMSC, but forwarding may be performed from the SMSC without substantial delay because the network 130-*d* has an established signaling connection with the destination device 320-*c*. As such, signaling flow 500 may provide almost immediate or real-time delivery of the SMS message.

Figure 6:
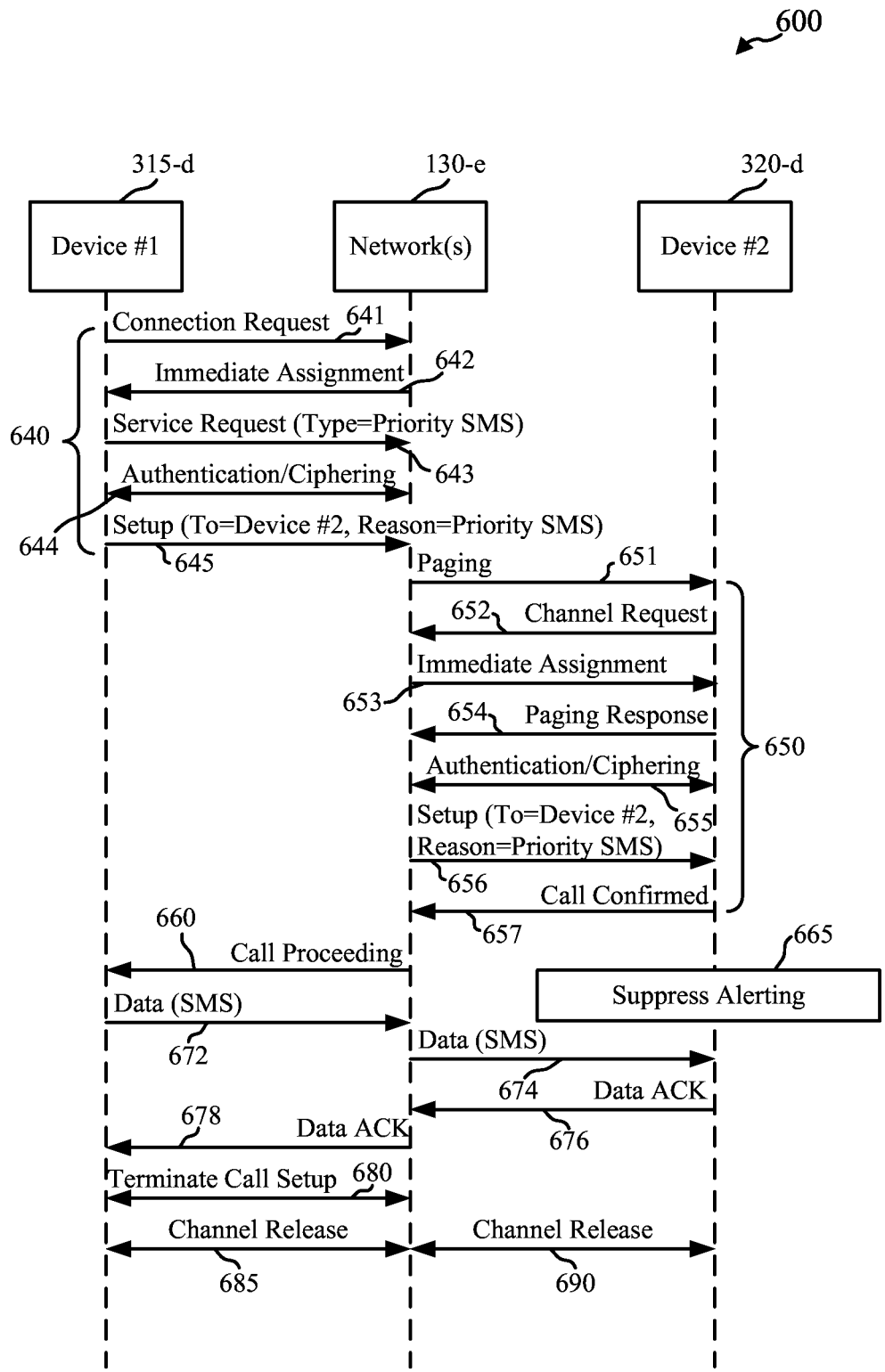
FIG. 6 shows a signaling flow for real-time SMS delivery using a real-time messaging call session indicator in GSM and/or UMTS networks in accordance with various embodiments.

FIG. 6 illustrates a signaling flow 600 for real-time SMS delivery using a real-time messaging call session indicator in GSM and/or UMTS networks in accordance with various embodiments. In signaling flow 600, an originating device 315-*d* sends a real-time SMS to a destination device 320-*d* by establishing a call session with the destination device 320-*d* through a GSM or UMTS core network 130-*e* before sending the SMS message. Core network 130-*e* illustrated in signaling flow 600 may represent aspects of one or more core networks associated with one or more radio access technologies. The destination device 320-*d* may be a mobile device 115 connected to network 130-*e*. The originating device 315-*d* may be a mobile device 115 connected to network 130-*e*, a mobile device 115 of another network (e.g., the wireless network of another carrier, etc.), or a non-mobile device or entity (e.g., SME 220, etc.) connected to network 130-*e* directly or through other networks (e.g., PDN 225, etc.). In one example, signaling flow 600 illustrates real-time SMS delivery for an SMS message sent from mobile device 115-*a* to mobile device 115-*b* through network 130-*a* as illustrated in FIG. 2.

In signaling flow 600, the originating device 315-*d* may be programmed or instructed (through an application layer, user prompts, etc.) to send a real-time SMS to the destination device 320-*d*. The originating device 315-*d* may initiate a call session with the destination device 320-*d* as illustrated by messaging sequence 640. Messaging sequence 640 may include connection request message 641 from originating device 315-*d* to network 130-*e*. Network 130-*e* may assign resources for the connection by sending immediate assignment message 642. Immediate assignment message 642 may assign control channel resources (e.g., SDCCH, etc.) for the originating device 315-*d* to perform call session setup. The originating device 315-*d* may send a service request message 643 to the network 130-*e* using the assigned resources. Service request message 643 may indicate that originating device 315-*d* is requesting establishment of a voice call. The service request message 643 may include an indicator of a real-time messaging service type. The network may perform authentication and/or ciphering 644 for originating device 315-*d*. After authentication and/or ciphering 644, the originating device 315-*d* may send call setup message 645 to the network 130-*e*, which may include addressing information for the destination device 320-*d*. As illustrated in signaling flow 600, the indicator of real-time message service type may be included in service request message 643 and/or the call setup message 645.

The network 130-*e* may perform a paging operation 650 to locate and confirm that the destination device 320-*d* is available to answer the call. The paging operation 650 may include sending paging messaging 651 by the network 130-*e* and receiving connection request message 652 from the destination device 320-*d*. The network 130-*e* may assign resources (e.g., DCCH, etc.) for the destination device 320-*d* using immediate assignment message 653 and the destination device 320-*d* may send paging response 654 to network 130-*e*. After authentication/ciphering 655, the network 130-*e* may send setup message 656 to the destination device 320-*d*. Setup message 656 may indicate to the destination device 320-*d* that the destination device 320-*d* has an incoming call from the originating device 315-*d*. The destination device 320-*d* may respond by confirming receipt of the call setup message using call confirmation message 657. After paging operation 650, the destination device 320-*d* may be in a call confirmed call state. Block 665 indicates that the destination device 320-*d* may suppress alerting messages in the call confirmed call state for incoming call sessions associated with the real-time messaging service type.

The network 130-*e* may then send a call proceeding message 660 to the originating device 315-*d* indicating that the destination device 320-*d* has been paged and has confirmed the call session. Upon receiving call proceeding message 660, the originating device 315-*d* may send an SMS message in a data message 672 using existing SMS message protocol signaling. Similarly to signaling flow 500, the SMS message may be sent to the destination device 320-*d* in data message 674 without the delay that might otherwise occur in the store-and-forward mechanism of traditional SMS messaging.

The destination device 320-*d* may acknowledge receiving the SMS message by sending an acknowledgement message 676 to the network 130-*e*. The network 130-*e* may send an acknowledgement message 678 to the originating device 315-*d*. Similarly to signaling flow 500, the acknowledgement message 678 may acknowledge that the SMS message has been received by the network 130-*e* and/or the destination device 320-*d*.

Call session setup may be terminated at step 680. Signaling messages 685 and 690 indicate that signaling channels set up during signaling flow 600 may then be released. Notably, termination of call setup may be performed prior to establishment of traffic radio bearers and/or traffic channels between the network 130-*e* and the originating device 315-*d* and/or the destination device 320-*d*. In this way, the call session setup process illustrated in signaling flow 600 may be performed without consuming traffic channel resources of the network 130-*e*. In some embodiments, call session setup may be terminated by the originating device 315-*d*. For example, the originating device 315-*d* may not respond to traffic radio bearer setup messaging and/or traffic channel setup messaging from network 130-*e*, or the originating device 315-*d* may send a not acknowledgment (NACK) message in response to traffic radio bearer setup messaging and/or traffic channel setup messaging from network 130-*e*. In some embodiments, call session setup may be terminated by the network 130-*e*. For example, the network 130-*e* may send a message that indicates that the call session is to be terminated without traffic radio bearer setup and/or traffic channel setup. In some embodiments, call session setup is terminated at step 680 without explicit termination signaling by either the originating device 315-*d* or the network 130-*e*. Because the originating device 315-*d* initiated call session setup with an indicator of a real-time messaging service type, the originating device 315-*d*, the network 130-*e*, and/or the destination device 320-*d* may release the established call session channels (e.g., DCCH, SDCCH, etc.) as indicated by arrows 685 and 690 without transmitting and/or receiving an explicit call session termination at step 680.

While signaling flow 600 illustrates operation of real-time SMS delivery over GSM and/or UMTS networks, one of skill in the art will appreciate that the disclosed techniques may be readily extended to other types of networks. For example, sequences similar to signaling flow 600 may be used for mobile originated and/or mobile terminated real-time SMS delivery in networks using other radio technologies (e.g., CDMA, LTE/LTE-A networks, etc.). In an LTE/LTE-A network, for example, an originating device may establish an RRC connection with the network 130 and send a service request message to initiate the call session. The originating device may receive a call proceeding message indicating that the destination device has been paged and then send the SMS message to the destination device. The originating device may then terminate call setup prior to establishing traffic channels (e.g., prior to activation of bearers for user data) between the originating and destination device.

Notably, sequences similar to signaling flows 500 and/or 600 may be used where the originating device and/or destination device are connected to different networks using the same or different RATs. Additionally, similar sequences may be used where the originating device 315 and/or destination device 320 is a non-mobile device (e.g., SME 220, etc.) connected to the network. For example, similar signaling flows may be used where the destination device is a mobile device 115 in communication with a network and the originating device is an SME on the same or a different network.

Referring back to FIG. 2, sequences similar to signaling flows 500 and/or 600 may be used to send a real-time SMS from SME 220 to mobile device 115-*a* and/or mobile device 115-*b*. For these instances, SME 220 may use one or more protocols for voice and SMS signaling (e.g., SS7, SMPP, etc.) through a signaling connection (e.g., PSTN, ISDN, PDN, etc.) with network 130 that generally correspond to the signaling messages between the originating devices 315-*c* and/or 315-*d* and the network 130 illustrated in signaling flows 500 and/or 600. For example, SME 220 may use SS7, SMPP, and/or other voice and messaging protocols to send a real-time SMS to a destination device such as mobile device 115-*a* and/or mobile device 115-*b* by sending a call request for setting up a call session with the destination device that indicates a real-time SMS message service type, receiving a call confirmation message indicating that the destination device has been paged and/or confirmed the call session, sending the SMS message, and terminating the call session.

Still referring to FIG. 2, sequences similar to signaling flows 500 and/or 600 may be used to send a real-time SMS from mobile device 115-*a* and/or mobile device 115-*b* to SME 220. In these instances, signaling from the network 130 to SME 220 may be performed using voice and messaging protocol signaling (e.g., SS7, SMPP, etc.) generally corresponding to the signaling messages between the network 130 and destination devices 320 illustrated in signaling flows 500 and/or 600.

Notably, signaling flows 300, 400, 500, and/or 600 are applicable to scenarios where an originating device 315 and network 130 support extended mobile protocol stacks with a real-time messaging service type while a destination device 320 may not. In these mixed scenarios, call session setup between the originating device 315 and the network 130 may be performed according to signaling flows 500 and/or 600 while signaling between the network 130 and destination device 320 is performed according to signaling flows 300 and/or 400. For example, an originating device 315 may use signaling corresponding to signaling flows 500 and/or 600 to perform real-time SMS with a destination device 320 while network 130 may page and forward the SMS to the destination device 320 using existing protocol stacks as illustrated in signaling flows 300 and/or 400.

Figure 7:
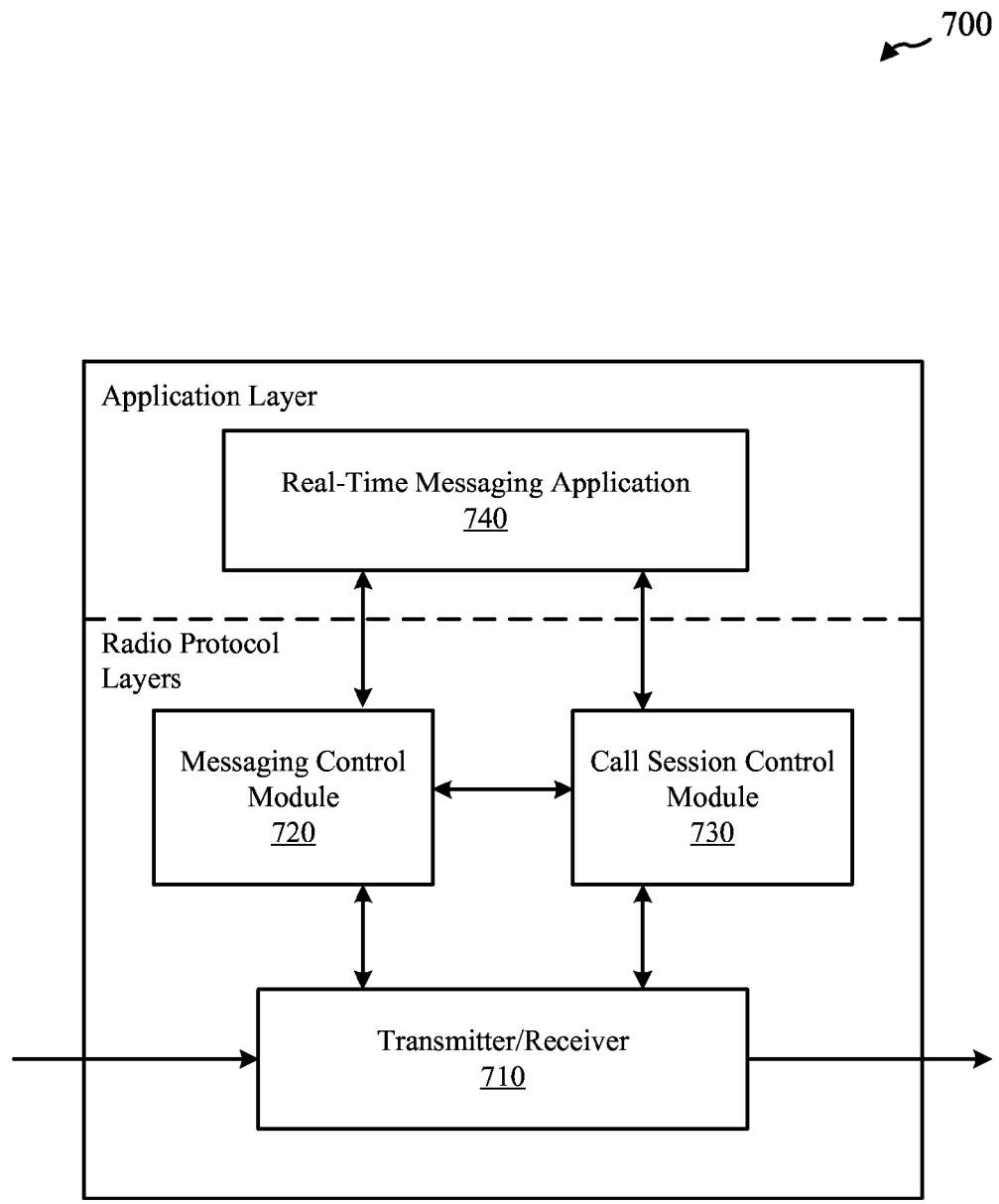
FIG. 7 shows a block diagram of a device that may be employed for real-time SMS messaging in accordance with various embodiments.

Turning next to FIG. 7, a block diagram of a device 700 that may be employed for real-time SMS messaging is illustrated in accordance with various embodiments. The device 700 may illustrate one or more aspects of originating devices 315 described with reference to FIGS. 3, 4, 5 and/or 6. The device 700 may illustrate one or more aspects of mobile devices 115 and/or SME 220 illustrated in FIG. 1 and/or FIG. 2. The device 700 may also be a processor. The device 700 may include a transmitter/receiver module 710, messaging control module 720, call session control module 730, and/or real-time messaging application 740. Each of these components may communicate with each other. Device 700 and/or its components may be configured to send and/or receive communications from other devices such as mobile devices 115, network entities (e.g., GMSC/SMS-GMSC 245, PDN 225, etc.), and/or base stations 105.

Real-time messaging application 740 may receive input (e.g., from a user or another application and/or process running on device 700) that directs application 740 to send a real-time SMS to a destination device. For example, a user may select an option for sending an SMS message that is associated with real-time messaging in accordance with described embodiments. Real-time messaging application 740 may communicate with call session control module 730 and messaging control module 720 to send the real-time SMS to the destination device by setting up a call session with the destination device and sending the SMS message within the call session. In embodiments, real-time messaging application 740 communicates with call session control module 730 to initiate a call session with the destination device. The call session control module 730 may receive a call confirmation message indicating that the destination device is available to receive the call session, and may forward the call confirmation message to the real-time messaging application 740. The real-time messaging application may communicate with messaging control module 720 to send the SMS message to the destination device using existing SMS protocols. Real-time messaging application 740 may receive, via messaging control module 720, a confirmation message indicating that the message has been received. Real-time messaging application 740 may then, via call session control module 730, terminate the call session. In embodiments, real-time messaging application 740, call session control module 730, and/or messaging control module 720 support real-time messaging by sending an indicator of a real-time messaging call session type when initiating the call session.

Device 700 may also be configured to receive real-time SMS messages. For example, call session control module 730 may receive paging from a network for establishing a call session related to a real-time SMS messaging call session type. Call session control module 730 may respond to the paging messages by transmitting a call confirmed message and/or entering a call confirmed call state. In the call confirmed call state, the call session control module 730 may suppress alerting messaging typically associated with the call confirmed call state.

Components of device 700 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

Figure 8A:
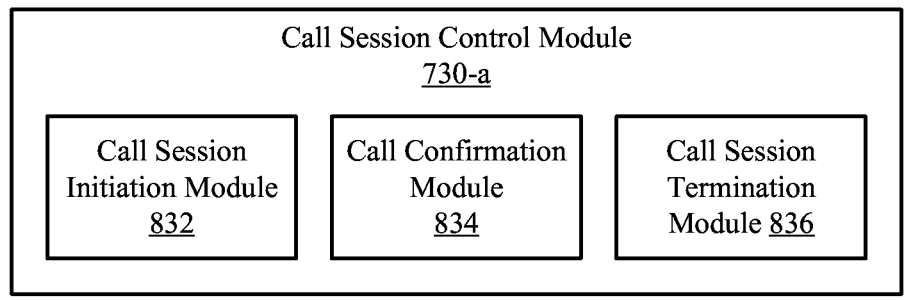
FIG. 8A shows a block diagram that illustrates an example of a module for real-time SMS call session control in accordance with various embodiments.

Turning next to FIG. 8A, a block diagram illustrates an example of a call session control module 730-*a* in accordance with various embodiments. Call session control module 730-*a* may illustrate, for example, aspects of call session control module 730 illustrated in FIG. 7 directed to sending real-time SMS messages from device 700. Call session control module 730-*a* may include call session initiation module 832, Call confirmation module 834, and/or call session termination module 836.

Call session initiation module 832 may initiate call sessions by generating and/or sending call initiation signaling such as connection requests, service requests, and/or call setup messages. Call session initiation module 832 may support extensions to the call initiation signaling for sending a call session type indicator indicating that the purpose of call session setup is to send a real-time SMS. Call confirmation module 834 may receive and/or process call confirmation signaling such as call proceeding messages. Call session termination module 836 may terminate call sessions.

Figure 8B:
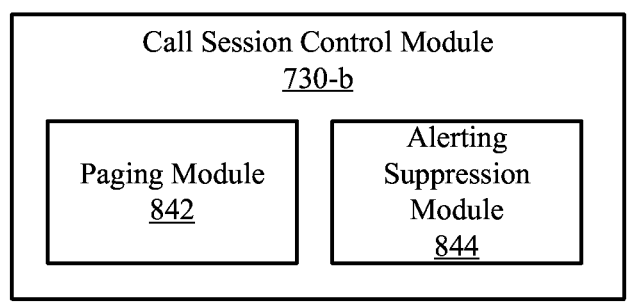
FIG. 8B shows a block diagram that illustrates an example of a module for real-time SMS call session control in accordance with various embodiments.

Turning next to FIG. 8B, a block diagram illustrates an example of a call session control module 730-*b* in accordance with various embodiments. Call session control module 730-*b* may illustrate, for example, aspects of call session control module 730 illustrated in FIG. 7 directed to receiving real-time SMS messages. Notably, call session control module 730 may include one or more of the modules for sending real-time SMS messages illustrated in FIG. 8A and/or one or more of the modules for receiving real-time SMS messages illustrated in FIG. 8B. Call session control module 730-*b* may include a paging module 842 and/or alerting suppression module 844.

Paging module 842 may receive paging from a network for establishing a call session related to a real-time SMS messaging call session type. Paging module 842 may respond to the paging messages by transmitting a call confirmed message. When paging module 842 transmits a call confirmed message, call session control module 730-*b* may enter a call confirmed call state. In the call confirmed call state, the alerting suppression module 844 may suppress sending of alerting messaging typically associated with the call confirmed call state.

Figure 9:
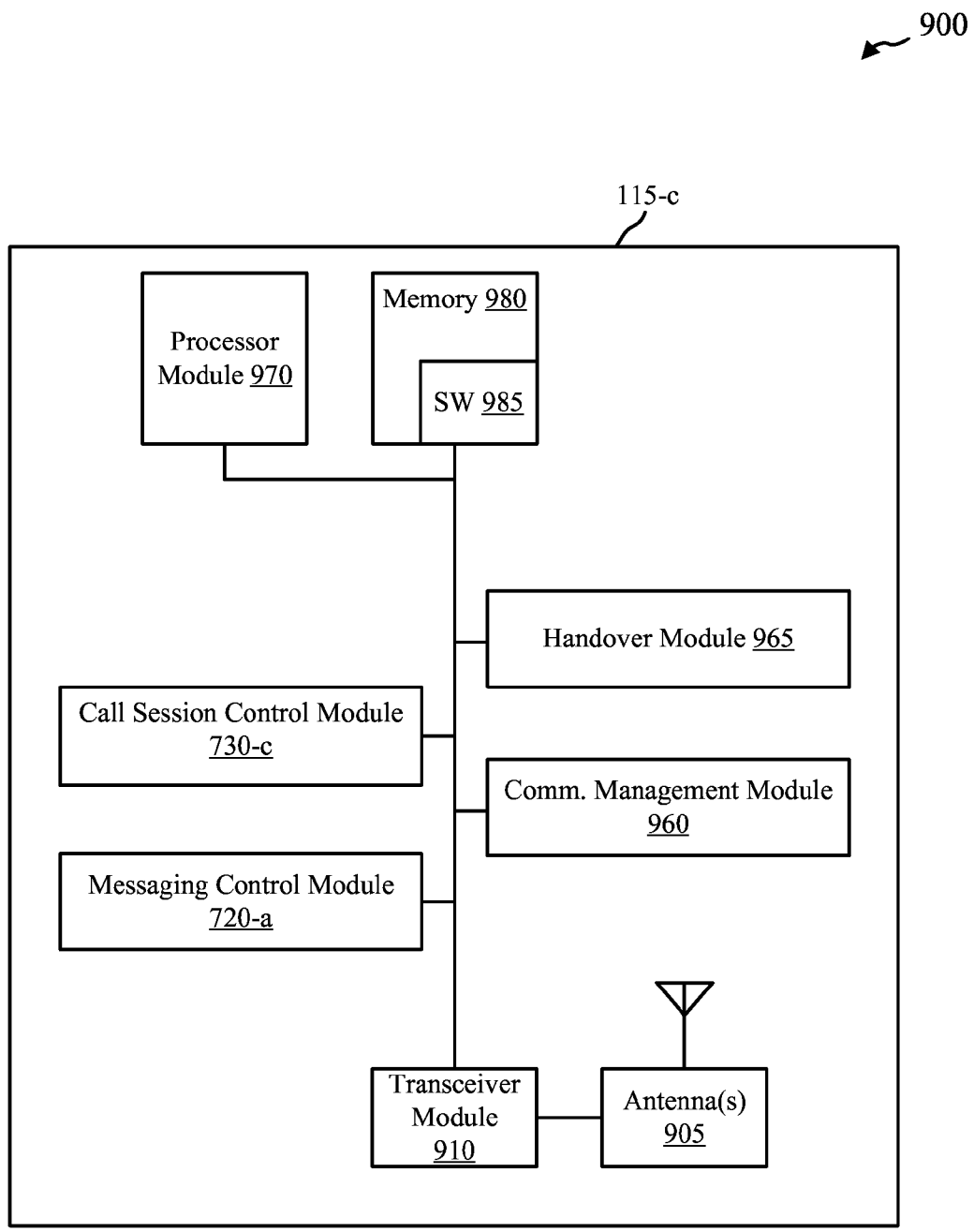
FIG. 9 shows a block diagram of a mobile device configured for real-time SMS messaging in accordance with various embodiments.

FIG. 9 is a block diagram 900 of a mobile device 115-*c* configured for real-time SMS messaging in accordance with various embodiments. The mobile device 115-*c* may have any of various configurations, such as personal computers (e.g., laptop computers, netbook computers, tablet computers, etc.), cellular telephones, PDAs, smartphones, digital video recorders (DVRs), internet appliances, gaming consoles, e-readers, etc. The mobile device 115-*c* may have an internal power supply (not shown), such as a small battery, to facilitate mobile operation. In some embodiments, the mobile device 115-*c* may be the mobile devices 115 of FIG. 1 and/or FIG. 2.

The mobile device 115-*c* may generally include components for bi-directional voice and data communications including components for transmitting communications and components for receiving communications. The mobile device 115-*d* may include a transceiver module 910, antenna(s) 905, memory 980, and a processor module 970, which each may communicate, directly or indirectly, with each other (e.g., via one or more buses). The transceiver module 910 is configured to communicate bi-directionally, via the antenna(s) 905 and/or one or more wired or wireless links, with one or more networks, as described above. For example, the transceiver module 910 may be configured to communicate bi-directionally with base stations 105 of FIG. 1 and/or network cells 205 of FIG. 2. The transceiver module 910 may include a modem configured to modulate the packets and provide the modulated packets to the antenna(s) 905 for transmission, and to demodulate packets received from the antenna(s) 905. While the mobile device 115-*c* may include a single antenna 905, the mobile device 115-*c* may have multiple antennas 905 capable of concurrently transmitting and/or receiving multiple wireless transmissions.

The memory 980 may include random access memory (RAM) and read-only memory (ROM). The memory 980 may store computer-readable, computer-executable software/firmware code 985 containing instructions that are configured to, when executed, cause the processor module 970 to perform various functions described herein (e.g., call processing, database management, message routing, etc.). Alternatively, the software/firmware code 985 may not be directly executable by the processor module 970 but be configured to cause a computer (e.g., when compiled and executed) to perform functions described herein.

The processor module 970 may include an intelligent hardware device, e.g., a central processing unit (CPU) such as those made by Intel® Corporation or AMD®, a microcontroller, an application-specific integrated circuit (ASIC), etc. The mobile device 115-*c* may include a speech encoder (not shown) configured to receive audio via a microphone, convert the audio into packets (e.g., 20 ms in length, 30 ms in length, etc.) representative of the received audio, provide the audio packets to the transceiver module 910, and provide indications of whether a user is speaking. Alternatively, the voice encoder may only provide packets to the transceiver module 910, with the provision or withholding/suppression of the packet itself providing the indication of whether a user is speaking. the speech encoder may be implemented in a separate module or the functions of the speech encoder may be performed by processor 970.

According to the architecture of FIG. 9, the mobile device 115-*c* may further include a communications management module 960. The communications management module 960 may manage communications with base stations 105. By way of example, the communications management module 960 may be a component of the mobile device 115-*c* in communication with some or all of the other components of the mobile device 115-*c* via a bus. Alternatively, functionality of the communications management module 960 may be implemented as a component of the transceiver module 910, as a computer program product, and/or as one or more controller elements of the processor module 970.

In some embodiments, a handover module 965 may be utilized to perform handover procedures of the mobile device 115-*c* from one base station 105 to another. For example, the handover module 965 may perform a handover procedure of the mobile device 115-*c* from one base station to another where voice communications are being received from the base stations.

The mobile device 115-*c* may be configured to send and receive real-time SMS messages as illustrated in FIGS. 3, 4, 5, and/or 6. The mobile device 115-*c* may send real-time SMS messages by setting up a call session with the destination device and sending the SMS message within the call session. In embodiments, the mobile device 115-*c* supports real-time messaging by sending an indicator of a real-time messaging call session type when initiating the call session. The mobile device 115-*c* may terminate the call session prior to establishment of traffic radio bearers and/or traffic channels with the network.

The components for mobile device 115-*c* may be configured to implement aspects discussed above with respect to device 700 of FIG. 7 and may not be repeated here for the sake of brevity. For example, the call session control module 730-*c* may include similar functionality as the call session control module 730 and the messaging control module 720-*a* may include similar functionality as the messaging control module 720.

Figure 10:
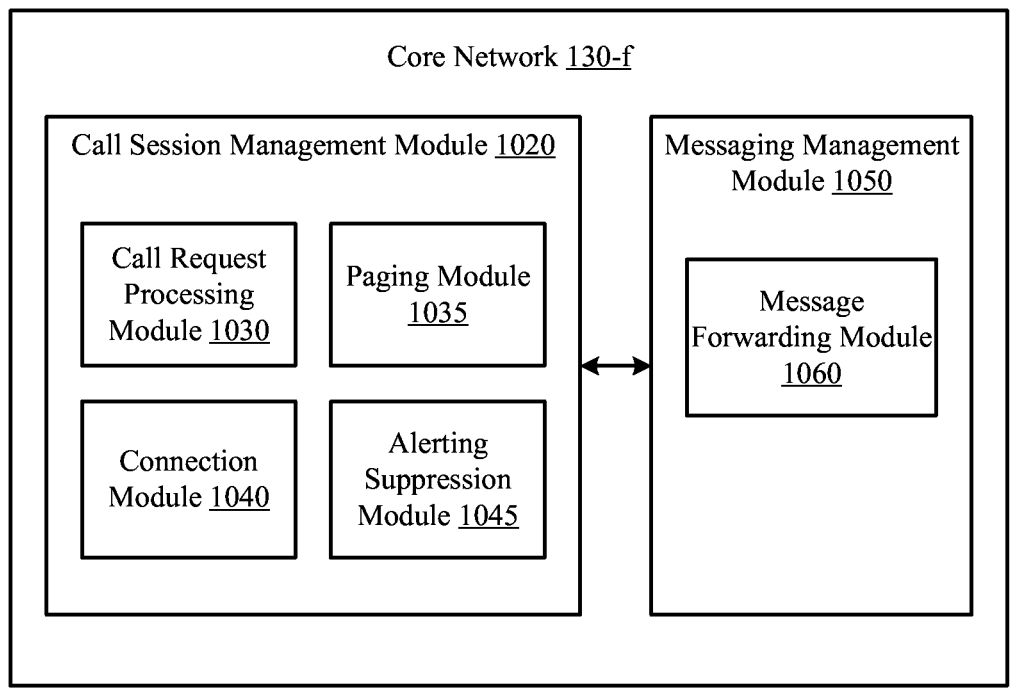
FIG. 10 shows a block diagram of a core network configured for real-time SMS messaging in accordance with various embodiments.

FIG. 10 is a block diagram 1000 illustrating a core network 130-*f* in accordance with various embodiments. Core network 130-*f* may be an example of aspects of the core networks 130 illustrated in FIGS. 1, 2, 3, 4, 5, and/or 6. Core network 130-*f* may include call session management module 1020 and/or messaging management module 1050. Call session management module 1020 may include call request processing module 1030, paging module 1035, and/or Connection module 1040. Messaging management module 1050 may include message forwarding module 1060. Each of these components may communicate with each other. Core network 130-*f* and/or its components may be configured to send and/or receive communications from other devices such as mobile devices 115, network cells 205, and/or other network entities (e.g., PDN 225, etc.).

Call session management module 1020 may receive call session requests for establishing call sessions between originating devices and destination devices and the requests may be processed by call request processing module 1030. Paging module 1035 may page the destination devices and connection module 1040 may manage the connection with the destination device. Alerting suppression module 1045 may suppress relaying of alerting messages from the destination device to the originating device for real-time SMS message service. Message management module 1050 may receive data messages (e.g., SMS, etc.) for delivery to a destination device and forward, via message forwarding module 1060, the messages to the destination device.

In embodiments, call session management module 1020 may receive a call session request from an originating device that indicates that the requested call session is related to a real-time SMS message. The paging module 1035 may page the destination device and include the indicator that the call session is related to the real-time SMS message service. The connection module 1040 may determine that the destination device is in a call confirmed state. The call session management module 1020 may receive alerting messages from the destination device and the alerting suppression module 1045 may suppress relaying the alerting messages to the originating device. Messaging management module 1050 may perform accounting and/or other functions related to offering real-time SMS messaging as a value added service, according to various embodiments.

It will be appreciated that the functions of the various modules of core network 130-*f* may be implemented in one or more network entities such as the MSC, SMSC, GMSC/SMS-GMSC, and/or other entities. The illustrated modules of core network 130-*f* may represent processes residing on a server within one or more of these network entities. The functions/processes of the illustrated modules may be performed by one or more processing units (or cores), on one or more integrated circuits. In other embodiments, other types of integrated circuits may be used (e.g., ASICs, Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

Figure 11:
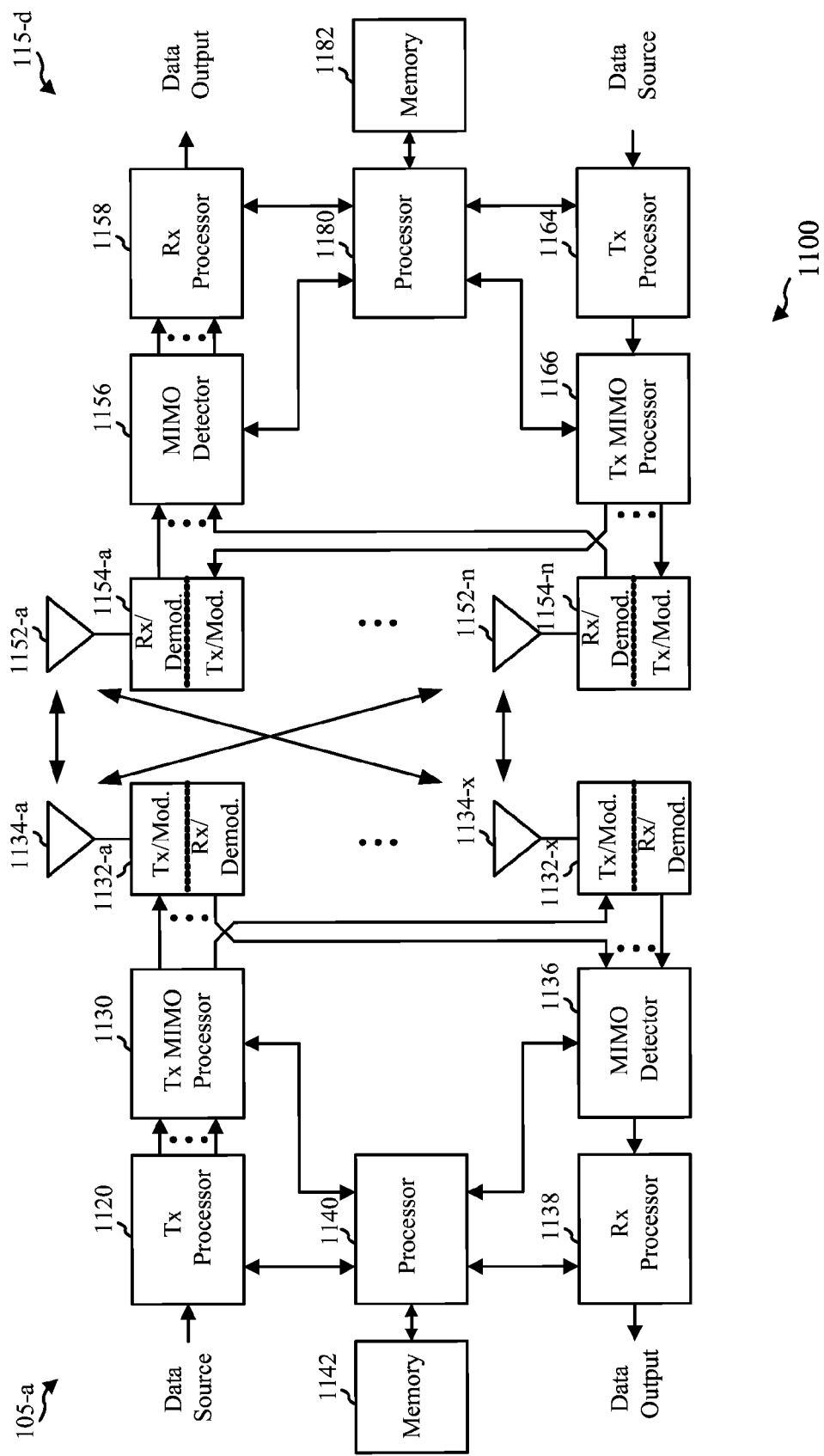
FIG. 11 shows a block diagram of a wireless communications system that includes a base station and a mobile device in accordance with various embodiments.

FIG. 11 is a block diagram of a system 1100 for real-time SMS messaging in accordance with various embodiments. This system 1100 may be an example of the system 100 of FIG. 1 and/or the system 200 of FIG. 2. The base station 105-*a* and/or device 115-*d* may be capable of Multiple-Input, Multiple-Output (MIMO) communications using multiple antennas. The base station 105-*a* may be equipped with antennas 1134-*a* through 1134-*x*, and the mobile device 115-*d* may be equipped with antennas 1152-*a* through 1152-*n*.

At the base station 105-*a*, a transmit processor 1120 may receive data from a data source. The transmitter processor 1120 may process the data. The transmitter processor 1120 may also generate reference symbols, and a cell-specific reference signal. A transmit (TX) MIMO processor 1130 may perform spatial processing (e.g., precoding) on data symbols, control symbols, and/or reference symbols, if applicable, and may provide output symbol streams to the transmit modulators 1132-*a* through 1132-*x*. Each modulator 1132 may process a respective output symbol stream (e.g., for OFDM, etc.) to obtain an output sample stream. Each modulator 1132 may further process (e.g., convert to analog, amplify, filter, and upconvert) the output sample stream to obtain a downlink (DL) signal. In one example, DL signals from modulators 1132-*a* through 1132-*x* may be transmitted via the antennas 1134-*a* through 1134-*x*, respectively. The transmitter processor 1120 may receive information from a processor 1140. The processor 1140 may be configured to support real-time SMS messaging to and from the mobile device 115-*d*. For example, the processor 1140 may support real-time messaging that originates from another mobile device 115 or SME 220 and is terminated at the mobile device 115-*d*. The processor 1140 may receive call session requests from the originating device for establishing call sessions between the originating device and the mobile device 115-*d*. The processor 1140 may page the mobile device 115-*d* and establish a connection with the mobile device 115-*d*. The processor 1140 may suppress relaying of alerting messages from the mobile device 115-*d* to the originating device for real-time SMS message service. The processor 1140 may receive data messages (e.g., SMS, etc.) for delivery to the mobile device 115-*d* and forward the messages to the mobile device 115-*d*. The processor 1140 may also support real-time messaging that is originated at the mobile device 115-*d*.

In embodiments, the processor 1140 may support real-time messaging using protocol stacks extended with a real-time messaging call type. The processor 1140 may receive a call session request from an originating device that indicates that the requested call session is related to a real-time SMS message. The processor 1140 page the destination device and include the indicator that the call session is related to the real-time SMS message service. The processor 1140 may determine that the destination device is in a call confirmed state. The processor 1140 may receive alerting messages from the destination device and may suppress relaying the alerting messages to the originating device. The processor 1140 may perform accounting and/or other functions related to offering real-time SMS messaging as a value added service, according to various embodiments. In some embodiments, the processor 1140 may be implemented as part of a general processor, the transmitter processor 1120, and/or the receiver processor 1138. A memory 1142 may be coupled with the processor 1140.

At the mobile device 115-*d*, the mobile device antennas 1152-*a* through 1152-*n* may receive the DL signals from the base station 105-*a* and may provide the received signals to the demodulators 1154-*a* through 1154-*n*, respectively. Each demodulator 1154 may condition (e.g., filter, amplify, down-convert, and digitize) a respective received signal to obtain input samples. Each demodulator 1154 may further process the input samples (e.g., for OFDM, etc.) to obtain received symbols. A MIMO detector 1156 may obtain received symbols from all the demodulators 1154-*a* through 1154-*n*, perform MIMO detection on the received symbols if applicable, and provide detected symbols. A receiver processor 1158 may process (e.g., demodulate, deinterleave, and decode) the detected symbols, providing decoded data for the mobile device 115-*d* to a data output, and provide decoded control information to a processor 1180, or memory 1182.

On the uplink (UL), at the mobile device 115-*d*, a transmitter processor 1164 may receive and process data from a data source. The transmitter processor 1164 may also generate reference symbols for a reference signal. The symbols from the transmitter processor 1164 may be precoded by a transmit MIMO processor 1166 if applicable, further processed by the demodulators 1154-*a* through 1154-*n* (e.g., for SC-FDMA, etc.), and be transmitted to the base station 105-*a* in accordance with the transmission parameters received from the base station 105-*a*. At the base station 105-*a*, the UL signals from the mobile device 115-*d* may be received by the antennas 1134, processed by the demodulators 1132, detected by a MIMO detector 1136 if applicable, and further processed by a receiver processor. The receiver processor 1138 may provide decoded data to a data output and to the processor 1180. In some embodiments, the processor 1180 may be implemented as part of a general processor, the transmitter processor 1164, and/or the receiver processor 1158.

In some embodiments, the processor 1180 is configured to provide real-time SMS messaging capability between the mobile device 115-*d* and a destination device such as another mobile device 115 or SME 220. The processor 1180 may perform real-time SMS messaging by communicating with base station 105-*a* to initiate a call session between the mobile device 115-*d* and the destination device, sending the SMS message within the call session, and terminating the call session prior to establishment of dedicated call traffic resources (e.g., traffic radio bearers and/or traffic channels, etc.). The processor 1180 may initiate the call session by sending a call session setup message to the network 130 via the base station 105-*a*. The call session setup message may indicate, for example, that the originating device is attempting to set up a voice call with the destination device. The network may page the destination device or otherwise determine whether the destination device is available to answer the call. The SMS message may be sent when the processor 1180 receives a call confirmation that the destination device is available to answer the call. The call session may then be terminated prior to establishment of traffic radio bearers and/or traffic channels associated with the call session.

In some embodiments, processor 1180 employs existing mobile protocol stacks to provide real-time messaging by using voice call setup procedures to establish a call session between the mobile device 115-*d* and a destination device before sending the SMS message. Messaging procedures may then be used to send the SMS message and receive an acknowledgement that the SMS message has been received by the destination device. The call session may be terminated before establishment of traffic radio bearers and/or traffic channels for the call.

In some embodiments, call session protocol stacks are extended to provide for an indication of a real-time SMS session type in the call session setup messaging between the originating device, the network, and/or the destination device. In these embodiments, the processor 1180 may send a call setup message to the network via base station 105-*a* and indicate in the message that the reason for the call setup is to send a real-time SMS to the destination device. The processor 1180 may also be configured to receive real-time SMS messages. For example, the processor 1180 may receive paging from a network for establishing a call session related to a real-time SMS messaging call session type. The processor 1180 may respond to the paging messages by transmitting a call confirmed message and/or entering a call confirmed call state. In the call confirmed call state, the processor 1180 may suppress alerting messaging typically associated with the call confirmed call state. The processor 1180 may receive the SMS message and the connection with the base station 105-*a* may be terminated prior to setup of traffic radio bearers and/or traffic channels between the mobile device 115-*d* and the base station 105-*a*.

Figure 12:
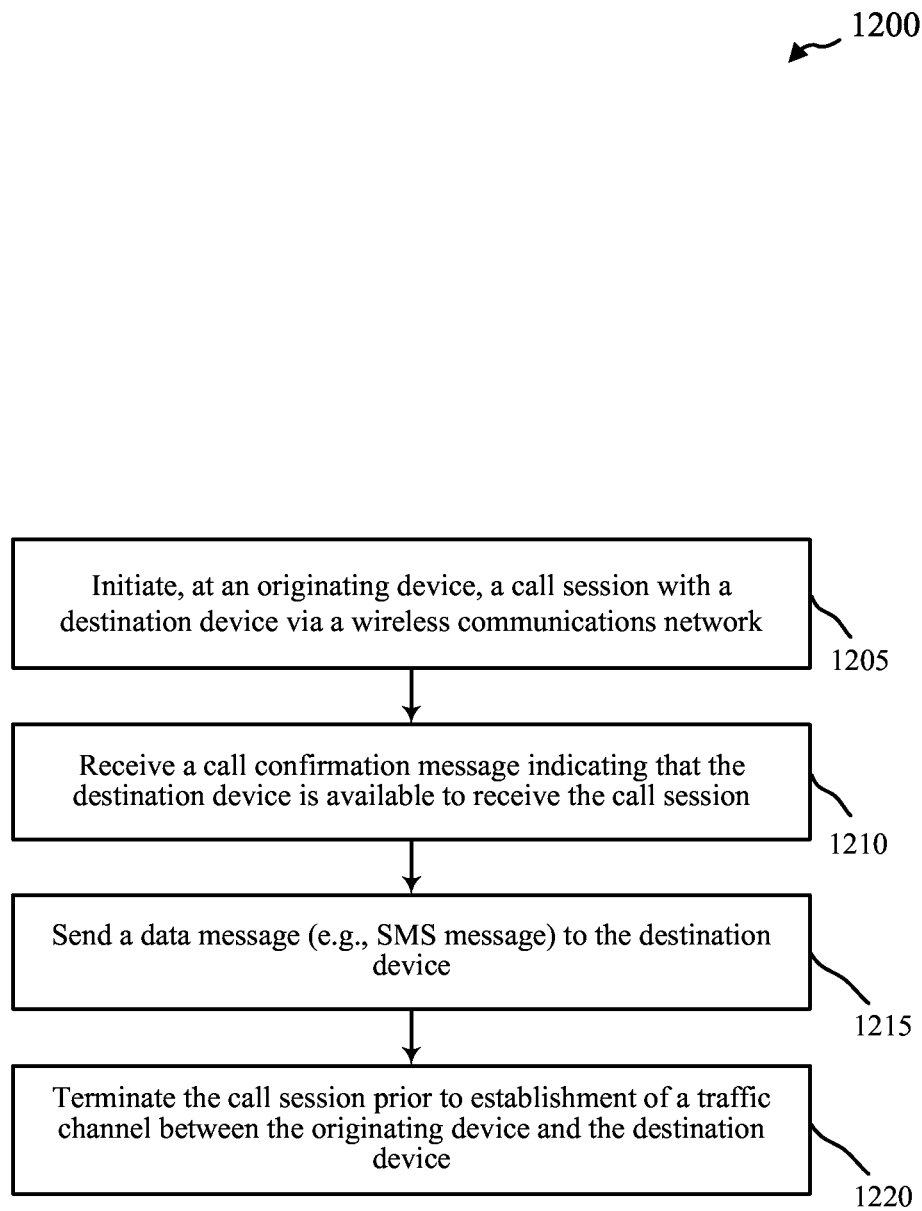
FIG. 12 shows a flow diagram of a method for real-time SMS messaging in accordance with various embodiments.

Turning to FIG. 12, a flow diagram of a method 1200 for real-time SMS messaging is illustrated in accordance with various embodiments. Method 1200 may be implemented utilizing various communications devices including, but not limited to a mobile device 115 as seen in FIG. 1, FIG. 2, FIG. 9, and/or FIG. 11, SME 220, and/or device 700 as seen in FIG. 7.

Method 1200 may begin at block 1205 where the device initiates a call session with a destination device via a wireless communications network. For example, the device may send a call session setup request to a core network 130 for establishing a call session with the destination device. In some embodiments, the call session setup request may be sent using existing mobile protocol stacks. In some embodiments, the mobile protocol stacks may be extended with a real-time message service type indicator for call session setup. In these embodiments, the device may send the indicator of the real-time message service type in the call session setup request to establish the call session with the destination device.

At block 1210, the device may receive a call confirmation message that the destination device is available to receive the call session. If the destination device is a mobile device connected to a wireless network, the network may page the destination device and return a call confirmation message when the destination device has responded to being paged. The device may then send the data message (e.g., SMS message) to the destination device at block 1215. At block 1220, the device may terminate the call session prior to establishment of a traffic channel between the device and the destination device.

Figure 13:
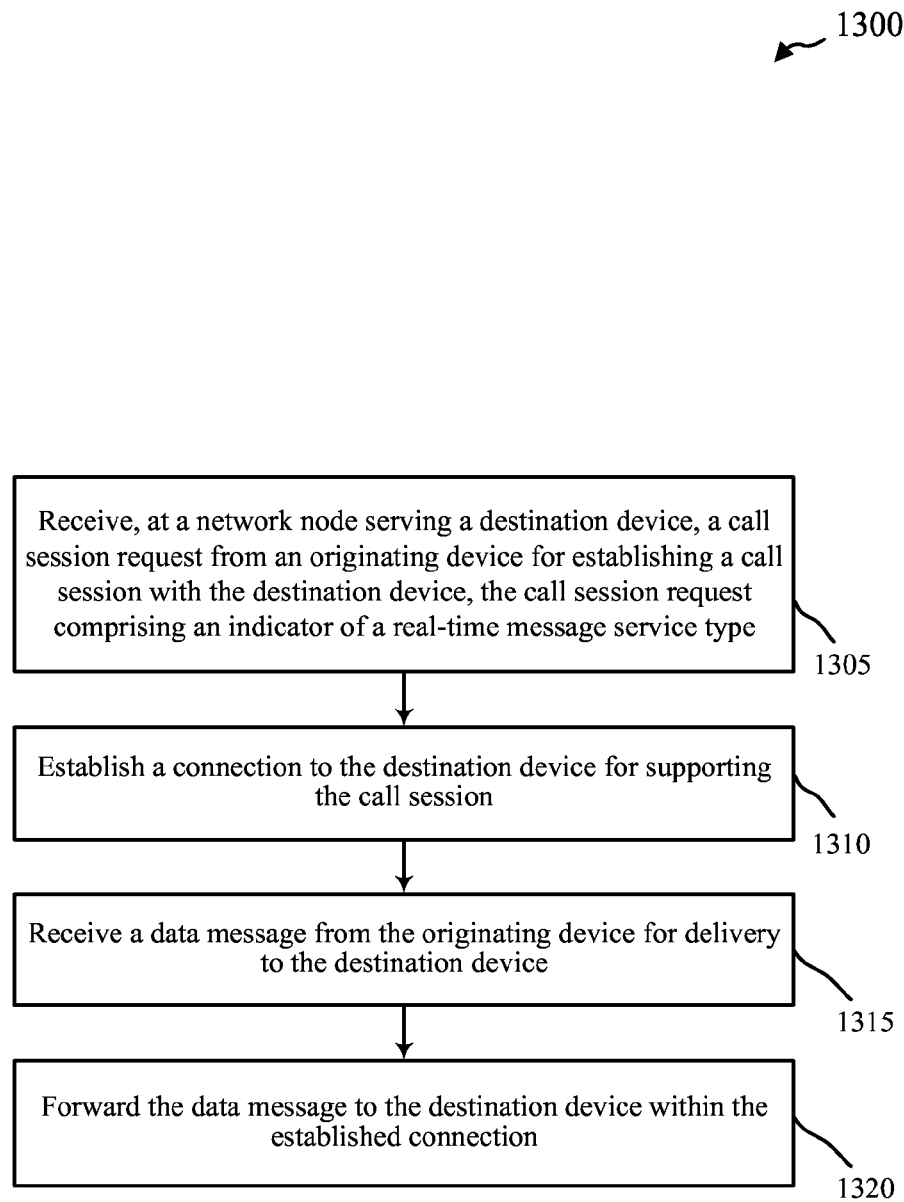
FIG. 13 shows a flow diagram of a method for real-time SMS messaging in accordance with various embodiments.

Turning to FIG. 13, a flow diagram of a method 1300 for real-time SMS messaging is illustrated in accordance with various embodiments. Method 1300 may be implemented utilizing various network entities or nodes including, but not limited to, entities and/or nodes of core network 130 as seen in FIG. 1, FIG. 2, and/or FIG. 10.

The method 1300 may begin at block 1305, when a network node serving a destination device receives a call session request from an originating device for establishing a call session with the destination device that includes an indicator of a real-time message service type. At block 1305, the network node may establish the call session with the destination device. The network node may determine whether the destination device supports a real-time messaging service type. If the destination device does not support the real-time messaging service type, the network node may page the destination device for establishing the call session using existing protocol stacks. If the destination device does support the real-time messaging service type, the network node may include an indicator of the real-time messaging service type in paging messages to the destination device to set up the call session.

With a connection to the destination device set up for supporting the call session, the network node may receive a data message (e.g., SMS message, etc.) from the originating device for delivery to the destination device at block 1315. Because of the established connection, the network node may forward the data message to the destination device at block 1320 without incurring delay typically associated with the store-and-forward architecture of SMS messaging. In embodiments, the network node may route the message to the destination device without using the SMSC, while in other embodiments the message may pass through the SMSC but the network node may concurrently notify the SMSC that the destination device is available such that the SMSC forwards the message without substantial delay.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software/firmware, or combinations thereof. If implemented in software/firmware, the functions may be stored on or transmitted over as one or more instructions or code on a computer-readable medium. Other examples and implementations are within the scope and spirit of the disclosure and appended claims. For example, due to the nature of software/firmware, functions described above can be implemented using software/firmware executed by, e.g., a processor, hardware, hardwiring, or combinations thereof. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general-purpose or special-purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

The invention claimed is:

1. A method for wireless communication, comprising:
   initiating, at an originating device, a call session with a destination device by sending a call session request message to a wireless communications network;
   receiving a call confirmation message in response to the call session request message indicating that the destination device is available to receive the call session, wherein the call confirmation message is based at least in part on a response message received from the destination device in response to the call session request message;
   sending a data message to the destination device based at least in part on receiving the call confirmation message at the originating device; and
   terminating the call session after the data message is sent and prior to establishment of a traffic channel between the originating device and the destination device.

2. The method of claim 1, wherein the initiating comprises:
   sending, from the originating device to the wireless communications network, a request to establish the call session with the destination device, the request comprising an indicator of a real-time message service type.

3. The method of claim 1, further comprising:
   receiving an acknowledgement message from the destination device indicating that the data message has been received at the destination device.

4. The method of claim 1, wherein terminating the call session comprises:
   sending a not acknowledgement (NACK) message to the wireless communications network responsive to receiving a traffic channel setup message from the wireless communications network for establishing the traffic channel for carrying traffic associated with the call session.

5. The method of claim 1, wherein the originating device is a mobile device configured to communicate via the wireless communications network.

6. The method of claim 1, wherein the destination device is a mobile device configured to communicate via the wireless communications network.

7. The method of claim 1, wherein the data message comprises a short message service (SMS) message.

8. The method of claim 1, wherein the call session comprises a voice call session.

9. A communications device, comprising:
   means for initiating a call session with a destination device by sending a call session request message to a wireless communications network;
   means for receiving a call confirmation message in response to the call session request message indicating that the destination device is available to receive the call session, wherein the call confirmation message is based at least in part on a response message received from the destination device in response to the call session request message;
   means for sending a data message to the destination device based at least in part on receiving the call confirmation message at the communications device; and
   means for terminating the call session after the data message is sent and prior to establishment of a traffic channel between the communications device and the destination device.

10. The communications device of claim 9, wherein the means for initiating comprises:
    means for sending, from the communications device to the wireless communications network, a request to establish the call session with the destination device, the request comprising an indicator of a real-time message service type.

11. The communications device of claim 9, further comprising:
    means for receiving an acknowledgement message from the destination device indicating that the data message has been received at the destination device.

12. The communications device of claim 9, wherein the means for terminating the call session comprises:
    means for sending a not acknowledgement (NACK) message to the wireless communications network responsive to receiving a traffic channel setup message from the wireless communications network for establishing the traffic channel for carrying traffic associated with the call session.

13. The communications device of claim 9, wherein the communications device comprises a mobile device configured to communicate via the wireless communications network.

14. The communications device of claim 9, wherein the destination device is a mobile device configured to communicate via the wireless communications network.

15. The communications device of claim 9, wherein the data message comprises a short message service (SMS) message.

16. The communications device of claim 9, wherein the call session comprises a voice call session.

17. A computer program product for sending a data message from an originating device, comprising:
    a non-transitory computer-readable medium comprising:
    code for initiating, by the originating device, a call session with a destination device by sending a call session request message to a wireless communications network;
    code for receiving a call confirmation message in response to the call session request message indicating that the destination device is available to receive the call session, wherein the call confirmation message is based at least in part on a response message received from the destination device in response to the call session request message;
    code for sending the data message to the destination device based at least in part on receiving the call confirmation message at the originating device; and
    code for terminating the call session after the data message is sent and prior to establishment of a traffic channel between the originating device and the destination device.

18. The computer program product of claim 17, wherein the code for initiating the call session comprises:
    code for sending, from the originating device to the wireless communications network, a request to establish the call session with the destination device, the request comprising an indicator of a real-time message service type.

19. The computer program product of claim 17, wherein the non-transitory computer-readable medium further comprises:

code for receiving an acknowledgement message from the destination device indicating that the data message has been received at the destination device.

20. The computer program product of claim 17, wherein the code for terminating the call session comprises:
code for sending a not acknowledgement (NACK) message to the wireless communications network responsive to receiving a traffic channel setup message from the wireless communications network for establishing the traffic channel for carrying traffic associated with the call session.

21. The computer program product of claim 17, wherein the originating device is a mobile device configured to communicate via the wireless communications network.

22. The computer program product of claim 17, wherein the destination device is a mobile device configured to communicate via the wireless communications network.

23. The computer program product of claim 17, wherein the data message comprises a short message service (SMS) message.

24. The computer program product of claim 17, wherein the call session comprises a voice call session.

25. A communications device comprising:
at least one processor configured to:
initiate a call session with a destination device by sending a call session request message to a wireless communications network;
receive a call confirmation message in response to the call session request message indicating that the destination device is available to receive the call session, wherein the call confirmation message is based at least in part on a response message received from the destination device in response to the call session request message;
send a data message to the destination device based at least in part on receiving the call confirmation message at the originating device; and
terminate the call session after the data message is sent and prior to establishment of a traffic channel between the communications device and the destination device.

26. The communications device of claim 25, wherein the at least one processor is further configured to:
send, from the communications device to the wireless communications network, a request to establish the call session with the destination device, the request comprising an indicator of a real-time message service type.

27. The communications device of claim 25, wherein the at least one processor is further configured to:
receive an acknowledgement message from the destination device indicating that the data message has been received at the destination device.

28. The communications device of claim 25, wherein the at least one processor is further configured to:
send a not acknowledgement (NACK) message to the wireless communications network responsive to receiving a traffic channel setup message from the wireless communications network for establishing the traffic channel for carrying traffic associated with the call session.

29. The communications device of claim 25, wherein the communications device comprises a mobile device configured to communicate via the wireless communications network.

30. The communications device of claim 25, wherein the destination device is a mobile device configured to communicate via the wireless communications network.

31. The communications device of claim 25, wherein the data message comprises a short message service (SMS) message.

32. The communications device of claim 25, wherein the call session comprises a voice call session.

* * * * *